(12) United States Patent
Goodwin et al.

(10) Patent No.: US 11,174,015 B2
(45) Date of Patent: Nov. 16, 2021

(54) MULTIMODE CLUTCH ASSEMBLIES HAVING ENGAGEMENT STATUS SENSORS

(71) Applicant: Textron Innovations Inc., Providence, RI (US)

(72) Inventors: Douglas Andrew Goodwin, Fort Worth, TX (US); David Andrew Prater, Hurst, TX (US); Eric Stephen Olson, Fort Worth, TX (US); David Bryan Roberts, Bedford, TX (US); Chia-Wei Su, Lewisville, TX (US); Michael David Trantham, Arlington, TX (US); Charles Eric Covington, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/063,712

(22) Filed: Oct. 5, 2020

(65) Prior Publication Data

US 2021/0070430 A1 Mar. 11, 2021

Related U.S. Application Data

(63) Continuation-in-part of application No. 16/567,086, filed on Sep. 11, 2019, now Pat. No. 10,793,284, (Continued)

(51) Int. Cl.
*B64C 27/12* (2006.01)
*B64D 35/08* (2006.01)
(Continued)

(52) U.S. Cl.
CPC .............. *B64C 27/12* (2013.01); *B64D 35/08* (2013.01); *F16D 41/04* (2013.01); *B64D 2027/026* (2013.01); *F16D 2041/0603* (2013.01)

(58) Field of Classification Search
CPC ......... B64C 27/12; B64C 27/14; B64C 27/06; B64D 27/10; B64D 27/12; B64D 27/24;
(Continued)

(56) References Cited

U.S. PATENT DOCUMENTS 3,362,255 A 1/1968 De et al.
3,455,182 A 7/1969 Kelley
(Continued)

*Primary Examiner* — David R Morris
*Assistant Examiner* — Lori Wu
(74) *Attorney, Agent, or Firm* — Lawrence Youst PLLC

(57) ABSTRACT

A multimode clutch assembly is positioned in a powertrain of a rotorcraft. The clutch assembly includes a freewheeling unit having a driving mode in which torque applied to the input race is transferred to the output race and an overrunning mode in which torque applied to the output race is not transferred to the input race. A bypass assembly has an engaged position that couples the input and output races of the freewheeling unit. An actuator assembly shifts the bypass assembly between engaged and disengaged positions. An engagement status sensor is configured to determine the engagement status of the bypass assembly. In the disengaged position, the overrunning mode of the freewheeling unit is enabled such that the clutch assembly is configured for unidirectional torque transfer. In the engaged position, the overrunning mode of the freewheeling unit is disabled such that the clutch assembly is configured for bidirectional torque transfer.

20 Claims, 18 Drawing Sheets

Related U.S. Application Data which is a continuation-in-part of application No. 16/274,520, filed on Feb. 13, 2019, now Pat. No. 10,788,088.

(60) Provisional application No. 62/801,621, filed on Feb. 5, 2019.

(51) Int. Cl.
*F16D 41/04* (2006.01)
*F16D 41/06* (2006.01)
*B64D 27/02* (2006.01)

(58) Field of Classification Search
CPC .. B64D 2027/026; B64D 35/02; B64D 35/04; B64D 35/08; B64D 41/00; B64D 45/0005; F16D 28/00; F16D 41/04; F16D 41/06; F16D 41/08; F16D 41/069; F16D 2041/0603; F16D 25/061; F16D 25/14; F16D 25/083; F16D 2300/18
See application file for complete search history.

(56) References Cited

U.S. PATENT DOCUMENTS

| | | | |
|---|---|---|---|
| 4,605,107 A * | 8/1986 | Hallidy | B66D 1/14 |
| | | | 192/56.2 |
| 4,711,332 A * | 12/1987 | Schuster | B60K 17/3505 |
| | | | 192/36 |
| 5,271,295 A | 12/1993 | Marnot | |
| 6,098,921 A | 8/2000 | Piasecki | |
| 6,313,625 B1 * | 11/2001 | Varady | G01D 5/2013 |
| | | | 324/173 |
| 8,950,700 B2 | 2/2015 | Westhuizen | |
| 9,580,184 B2 | 2/2017 | Bornes | |
| 10,040,566 B2 | 8/2018 | Waltner | |
| 2006/0269414 A1 | 11/2006 | Palcic et al. | |
| 2009/0078525 A1 | 3/2009 | Schumacher et al. | |
| 2011/0048147 A1 | 3/2011 | Keech et al. | |
| 2017/0327241 A1 | 11/2017 | Mitrovic et al. | |
| 2018/0086444 A1 | 3/2018 | Poster et al. | |
| 2018/0172088 A1 | 6/2018 | Peglowski et al. | |
| 2018/0202546 A1 * | 7/2018 | Egashira | F16D 48/06 |
| 2019/0032760 A1 | 1/2019 | Geiser et al. | |
| 2019/0368592 A1 * | 12/2019 | Gostin, Jr. | F16H 48/24 |
| 2020/0247553 A1 | 8/2020 | Prater et al. | |
| 2020/0248760 A1 | 8/2020 | Olson et al. | |

* cited by examiner

MULTIMODE CLUTCH ASSEMBLIES HAVING ENGAGEMENT STATUS SENSORS

CROSS-REFERENCE TO RELATED APPLICATIONS

The present application is a continuation-in-part of co-pending application Ser. No. 16/567,086, filed Sep. 11, 2019, which is a continuation-in-part of application Ser. No. 16/274,520, filed Feb. 13, 2019, which claims the benefit of provisional application No. 62/801,621, filed Feb. 5, 2019, the entire contents of each are hereby incorporated by reference.

GOVERNMENT RIGHTS

This invention was made with Government support under Agreement No. W911W6-19-9-0002, awarded by the Army Contracting Command-Redstone Arsenal. The Government has certain rights in the invention.

TECHNICAL FIELD OF THE DISCLOSURE

The present disclosure relates, in general, to clutch assemblies operable for use on rotorcraft and, in particular, to multimode clutch assemblies having engagement status sensors that are operable to enable the selective use of secondary engine power independent of or together with main engine power to drive the main rotor, the tail rotor and/or the accessories of a rotorcraft.

BACKGROUND

Many rotorcraft are capable of taking off, hovering and landing vertically. One such rotorcraft is a helicopter, which has a main rotor that provides lift and thrust to the aircraft. The main rotor not only enables hovering and vertical takeoff and landing, but also enables forward, backward and lateral flight. These attributes make helicopters highly versatile for use in congested, isolated or remote areas. It has been found that the power demand of a rotorcraft can vary significantly based upon the operation being performed. For example, low power demand exists during preflight operations, when power is only needed to operate accessories such as generators, air pumps, oil pumps, hydraulic systems and the like as well as to start the main engine. Certain rotorcraft utilize a dedicated auxiliary power unit to generate preflight accessory power. During takeoff, hover, heavy lifts and/or high speed operations, rotorcraft experience high power demand. Certain rotorcraft utilize multiple main engines or one main engine and a supplemental power unit to generate the required power for the main rotor during such high power demand flight operations. In conventional rotorcraft, the dedicated auxiliary power unit is not operable to provide supplemental power to the main rotor during high power demand flight operations. Accordingly, a need has arisen for improved rotorcraft systems that enable an auxiliary power unit to not only provide accessory power during preflight operations but also to operate as a supplemental power unit to provide power to the main rotor during high power demand flight operations.

SUMMARY

In a first aspect, the present disclosure is directed to a multimode clutch assembly for a rotorcraft. The clutch assembly includes a freewheeling unit having an input race and an output race. The freewheeling unit has a driving mode in which torque applied to the input race is transferred to the output race and an overrunning mode in which torque applied to the output race is not transferred to the input race. A bypass assembly has an engaged position in which the bypass assembly couples the input and output races of the freewheeling unit and a disengaged position in which the bypass assembly does not couple the input and output races of the freewheeling unit. An actuator assembly has an engagement configuration supplying an engagement force to shift the bypass assembly from the disengaged position to the engaged position and a disengagement configuration supplying a disengagement force to shift the bypass assembly from the engaged position to the disengaged position. An engagement status sensor is operably associated with at least one of the bypass assembly and the actuator assembly. The engagement status sensor is configured to determine an engagement status of the bypass assembly. In the disengaged position of the bypass assembly, the overrunning mode of the freewheeling unit is enabled such that the clutch assembly is configured for unidirectional torque transfer from the input race to the output race. In the engaged position of the bypass assembly, the overrunning mode of the freewheeling unit is disabled such that the clutch assembly is configured for bidirectional torque transfer between the input and output races.

In some embodiments, the engagement status sensor may be a proximity sensor. In such embodiments, the actuator assembly may include a liner, a piston and a bearing sled wherein the piston is slidably disposed relative to the liner and the bearing sled is coupled between the piston and the bypass assembly and wherein the proximity sensor may be an inductive proximity sensor configured to monitor the position of the bearing sled relative thereto to determine the engagement status of the bypass assembly. Alternatively, the proximity sensor may be a load cell, such as a strain sensor, that is configured to monitor the position of the bypass assembly relative thereto to determine the engagement status of the bypass assembly. In certain embodiments, the engagement status sensor may be an oil pressure sensor. In some embodiments, the engagement status sensor may be a tooth passage frequency sensor such as a variable reluctance sensor or a hall-effect sensor. In other embodiments, the engagement status sensor may be a variable differential transformer such as a linear variable differential transformer or a rotary variable differential transformer.

In a second aspect, the present disclosure is directed to a powertrain for a rotorcraft. The powertrain has a main drive system including a main engine. The powertrain also has a secondary engine and a multimode clutch assembly that is positioned between the main drive system and the secondary engine. The clutch assembly includes a freewheeling unit having an input race coupled to the main drive system and an output race coupled to the secondary engine. The freewheeling unit has a driving mode in which torque applied to the input race is transferred to the output race and an overrunning mode in which torque applied to the output race is not transferred to the input race. A bypass assembly has an engaged position in which the bypass assembly couples the input and output races of the freewheeling unit and a disengaged position in which the bypass assembly does not couple the input and output races of the freewheeling unit. An actuator assembly has an engagement configuration supplying an engagement force to shift the bypass assembly from the disengaged position to the engaged position and a disengagement configuration supplying a disengagement force to shift the bypass assembly from the engaged position to the disengaged position. An engagement status sensor is operably associated with at least one of the bypass assembly and the actuator assembly. The engagement status sensor is configured to determine an engagement status of the bypass assembly. In the disengaged position of the bypass assembly, the overrunning mode of the freewheeling unit is enabled such that the clutch assembly is configured for unidirectional torque transfer from the input race to the output race. In the engaged position of the bypass assembly, the overrunning mode of the freewheeling unit is disabled such that the clutch assembly is configured for bidirectional torque transfer between the input and output races.

In some embodiments, the main engine may be a gas turbine engine and the secondary engine may be a gas turbine engine. In other embodiments, the main engine may be a gas turbine engine and the secondary engine may be an electric motor. In certain embodiments, the secondary engine may be configured to generate between about 5 percent and about 20 percent of the power of the main engine or between about 10 percent and about 15 percent of the power of the main engine.

In a third aspect, the present disclosure is directed to a rotorcraft. The rotorcraft includes a main rotor coupled to a main drive system including a main engine. The rotorcraft also includes a secondary engine and a multimode clutch assembly that is positioned between the main drive system and the secondary engine. The clutch assembly includes a freewheeling unit having an input race coupled to the main drive system and an output race coupled to the secondary engine. The freewheeling unit has a driving mode in which torque applied to the input race is transferred to the output race and an overrunning mode in which torque applied to the output race is not transferred to the input race. A bypass assembly has an engaged position in which the bypass assembly couples the input and output races of the freewheeling unit and a disengaged position in which the bypass assembly does not couple the input and output races of the freewheeling unit. An actuator assembly has an engagement configuration supplying an engagement force to shift the bypass assembly from the disengaged position to the engaged position and a disengagement configuration supplying a disengagement force to shift the bypass assembly from the engaged position to the disengaged position. An engagement status sensor is operably associated with at least one of the bypass assembly and the actuator assembly. The engagement status sensor is configured to determine an engagement status of the bypass assembly. In the disengaged position of the bypass assembly, the overrunning mode of the freewheeling unit is enabled such that the clutch assembly is configured for unidirectional torque transfer from the input race to the output race. In the engaged position of the bypass assembly, the overrunning mode of the freewheeling unit is disabled such that the clutch assembly is configured for bidirectional torque transfer between the input and output races.

In a preflight configuration of the rotorcraft, the bypass assembly is in the disengaged position, the main engine is not operating and the secondary engine provides power to at least one rotorcraft accessory. In an enhanced power configuration of the rotorcraft, the bypass assembly is in the engaged position, the main engine provides power to the main drive system and the secondary engine provides power to at least one rotorcraft accessory and to the main drive system through the clutch assembly. In a high efficiency configuration of the rotorcraft, the bypass assembly is in the engaged position, the secondary engine is in standby mode and the main engine provides power to the main drive system and to at least one rotorcraft accessory through the clutch assembly. In an enhanced autorotation configuration of the rotorcraft, the bypass assembly is in the engaged position, the main engine is not operating and the secondary engine provides power to the main drive system through the clutch assembly.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
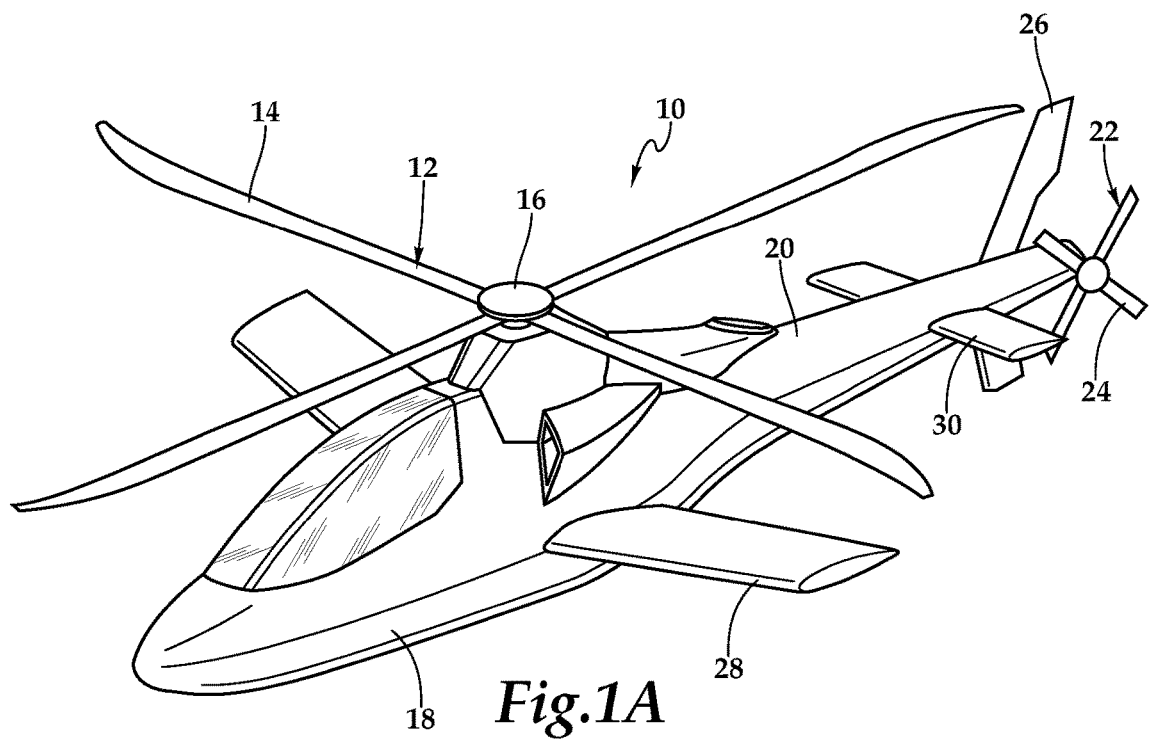
FIGS. 1A-1C are schematic illustrations of a rotorcraft having a multimode clutch assembly in accordance with embodiments of the present disclosure.
Figure 1B:
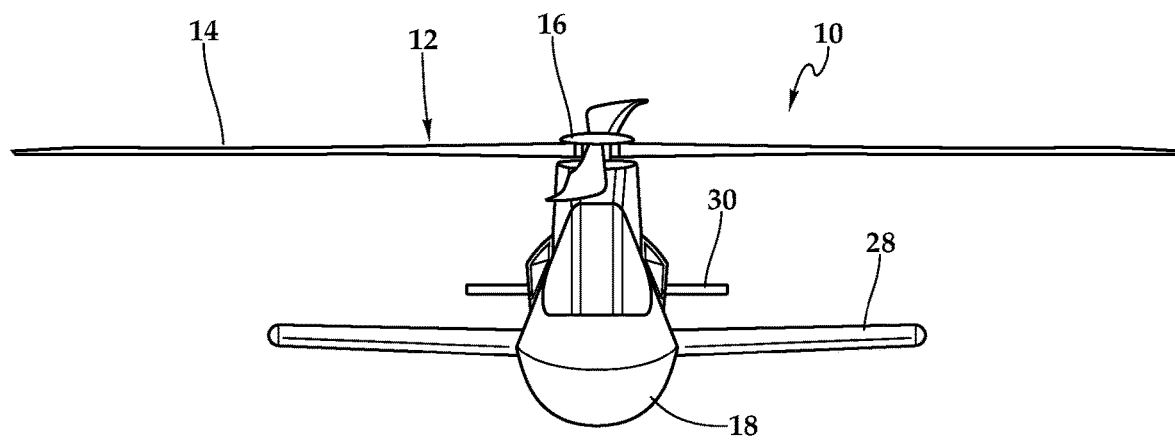
Figure 1C:
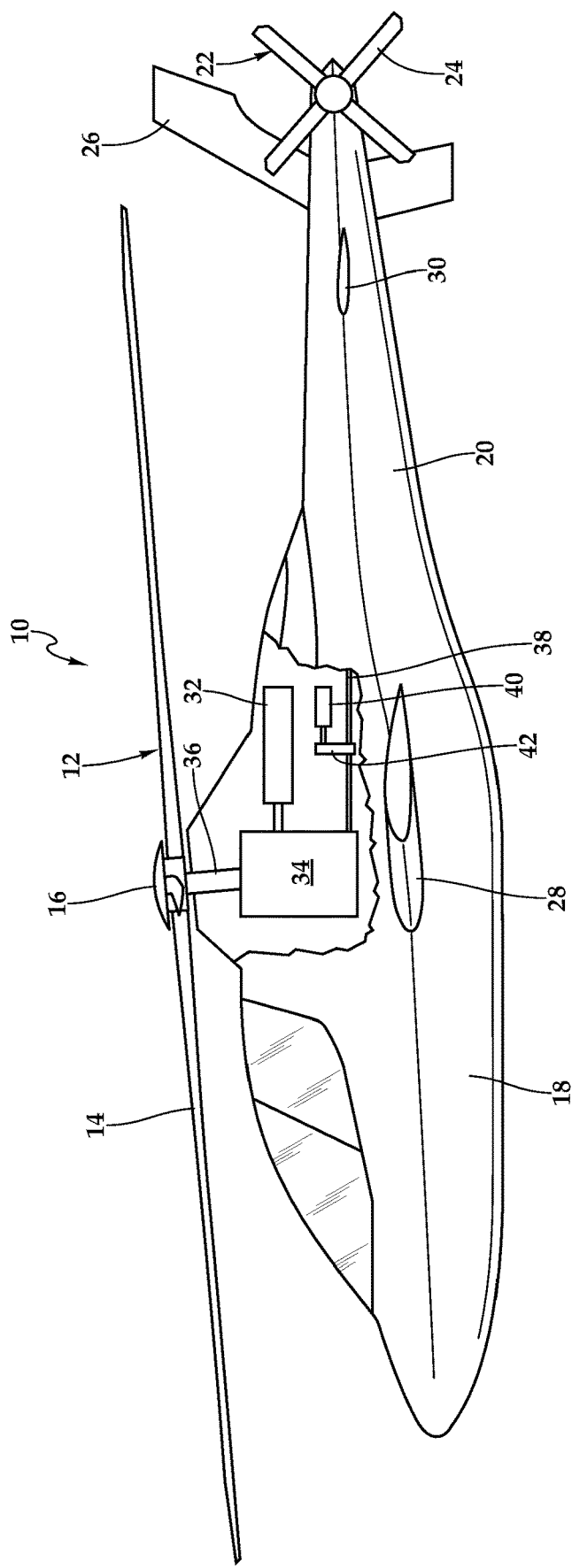

Referring to FIGS. 1A-1C in the drawings, a rotorcraft in the form of a helicopter is schematically illustrated and generally designated 10. The primary propulsion assembly of helicopter 10 is a main rotor assembly 12. Main rotor assembly 12 includes a plurality of rotor blades 14 extending radially outward from a main rotor hub 16. Main rotor assembly 12 is coupled to a fuselage 18 and is rotatable relative thereto. The pitch of rotor blades 14 can be collectively and/or cyclically manipulated to selectively control direction, thrust and lift of helicopter 10. A tailboom 20 is coupled to fuselage 18 and extends from fuselage 18 in the aft direction. An anti-torque system 22 includes a tail rotor assembly 24 coupled to an aft end of tailboom 20. Anti-torque system 22 controls the yaw of helicopter 10 by counteracting the torque exerted on fuselage 18 by main rotor assembly 12. In the illustrated embodiment, helicopter 10 includes a vertical tail fin 26 that provide stabilization to helicopter 10 during high speed forward flight. In addition, helicopter 10 includes wing members 28 that extend laterally from fuselage 18 and wing members 30 that extend laterally from tailboom 20. Wing members 28, 30 provide lift to helicopter 10 responsive to the forward airspeed of helicopter 10, thereby reducing the lift requirement on main rotor assembly 12 and increasing the top speed of helicopter 10

Main rotor assembly 12 and tail rotor assembly 24 receive torque and rotational energy from a main engine 32. Main engine 32 is coupled to a main rotor gearbox 34 by suitable clutching and shafting. Main rotor gearbox 34 is coupled to main rotor assembly 12 by a mast 36 and is coupled to tail rotor assembly 24 by tail rotor drive shaft 38. In the illustrated embodiment, a secondary engine 40 is coupled to tail rotor drive shaft 38 by a secondary gearbox 42. Together, main engine 32, main rotor gearbox 34, tail rotor drive shaft 38, secondary engine 40 and secondary gearbox 42 as well as various other shafts and gearboxes coupled therein may be considered as the powertrain of helicopter 10.

Secondary engine 40 is operable as an auxiliary power unit to provide preflight power to the accessories of helicopter 10 such as electric generators, air pumps, oil pumps, hydraulic systems and the like as well as to provide the power required to start main engine 32. In addition, secondary engine 40 is operable to provide supplemental power to main rotor assembly 12 that is additive with the power provided by main engine 32 during, for example, high power demand conditions including takeoff, hover, heavy lifts and high speed flight operations. Secondary engine 40 is also operable to provide emergency power to main rotor assembly 12. For example, in the event of a failure of main engine 32, secondary engine 40 is operable to provide emergency power to enhance the autorotation and flare recovery maneuver of helicopter 10. Use of secondary engine 40 not only enhances the safety of helicopter 10 but also increases the efficiency of helicopter 10. For example, having the extra power provided by secondary engine 40 during high power demand operations allows main engine 32 to be downsized for more efficient single engine operations such as during cruise operations.

It should be appreciated that helicopter 10 is merely illustrative of a variety of aircraft that can implement the embodiments disclosed herein. Indeed, the multimode clutch assembly of the present disclosure may be implemented on any rotorcraft. Other aircraft implementations can include hybrid aircraft, tiltwing aircraft, tiltrotor aircraft, quad tiltrotor aircraft, unmanned aircraft, gyrocopters, propeller-driven airplanes, compound helicopters, drones and the like. As such, those skilled in the art will recognize that the multimode clutch assembly of the present disclosure can be integrated into a variety of aircraft configurations. It should be appreciated that even though aircraft are particularly well-suited to implement the embodiments of the present disclosure, non-aircraft vehicles and devices can also implement the embodiments.

Figure 2A:
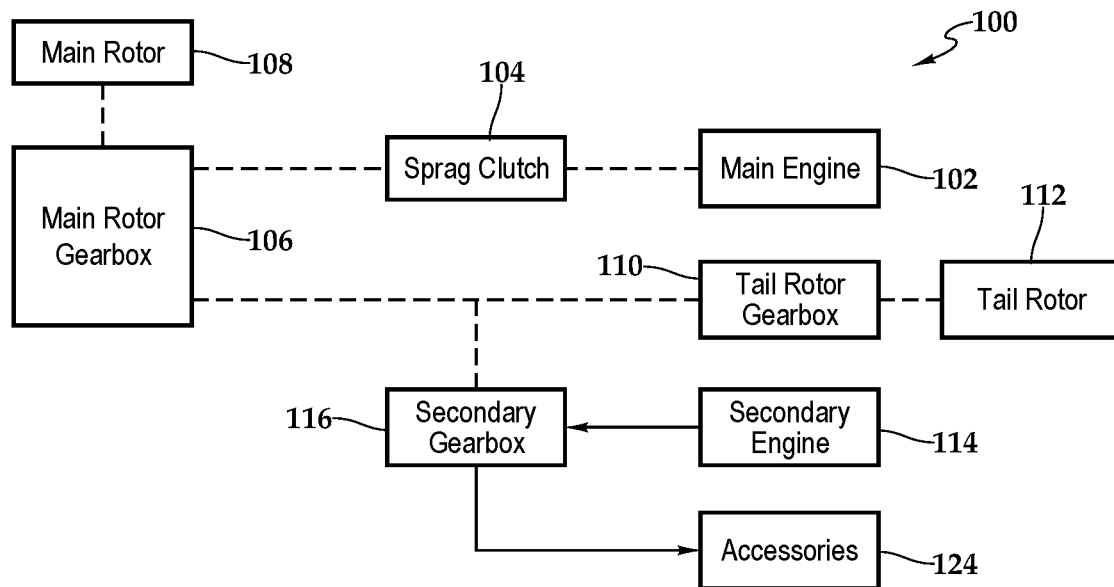
FIGS. 2A-2E are block diagrams of a powertrain including a multimode clutch assembly for a rotorcraft in various operating configurations in accordance with embodiments of the present disclosure.

Referring to FIG. 2A in the drawings, a powertrain 100 of a rotorcraft is illustrated in a block diagram format. Powertrain 100 includes a main engine 102 such as a turbo shaft engine capable of producing 2000 to 4000 horsepower or more, depending upon the particular implementation. Main engine 102 is coupled to a freewheeling unit depicted as sprag clutch 104 that acts as a one-way clutch enabling a driving mode in which torque from main engine 102 is coupled to main rotor gearbox 106 when the rotating speed of the input race, on the main engine side of sprag clutch 104, is matched with the rotating speed of the output race, on the main rotor gearbox side of sprag clutch 104. Importantly, sprag clutch 104 has an overrunning mode in which main engine 102 is decoupled from main rotor gearbox 106 when the rotating speed of the input race is less than the rotating speed of the output race of sprag clutch 104. Operating sprag clutch 104 in the overrunning mode allows, for example, main rotor 108 of helicopter 10 to engage in autorotation in the event of a failure of main engine 102.

In the illustrated embodiment, main rotor gearbox 106 is coupled to sprag clutch 104 via a suitable drive shaft. In addition, main rotor gearbox 106 is coupled to main rotor 108 by a suitable mast. Main rotor gearbox 106 includes a gearbox housing and a plurality of gears, such as planetary gears, used to adjust the engine output speed to a suitable rotor speed so that main engine 102 and main rotor 108 may each rotate at optimum speed during flight operations of helicopter 10. Main rotor gearbox 106 is coupled to a tail rotor gearbox 110 via a suitable tail rotor drive shaft. Tail rotor gearbox 110 includes a gearbox housing and a plurality of gears that may adjust the main rotor gearbox output speed to a suitable rotational speed for operation of tail rotor 112. Main engine 102, sprag clutch 104, main rotor gearbox 106 and tail rotor gearbox 110 as well as various shafts and gearing systems coupled therewith may be considered the main drive system of powertrain 100.

Powertrain 100 includes a secondary engine 114 such as a turbo shaft engine or an electric motor capable of producing 200 to 400 horsepower or more, depending upon the particular implementation. In the illustrated embodiment, secondary engine 114 may generate between about 5 percent and about 20 percent or more of the horsepower of main engine 102. In other embodiments, secondary engine 114 may generate between about 10 percent and about 15 percent of the horsepower of main engine 102. Secondary engine 114 is coupled to a secondary gearbox 116. Secondary engine 114 and secondary gearbox 116 as well as various shafts and gearing systems coupled therewith may be considered the secondary drive system of powertrain 100.

Figure 3A:
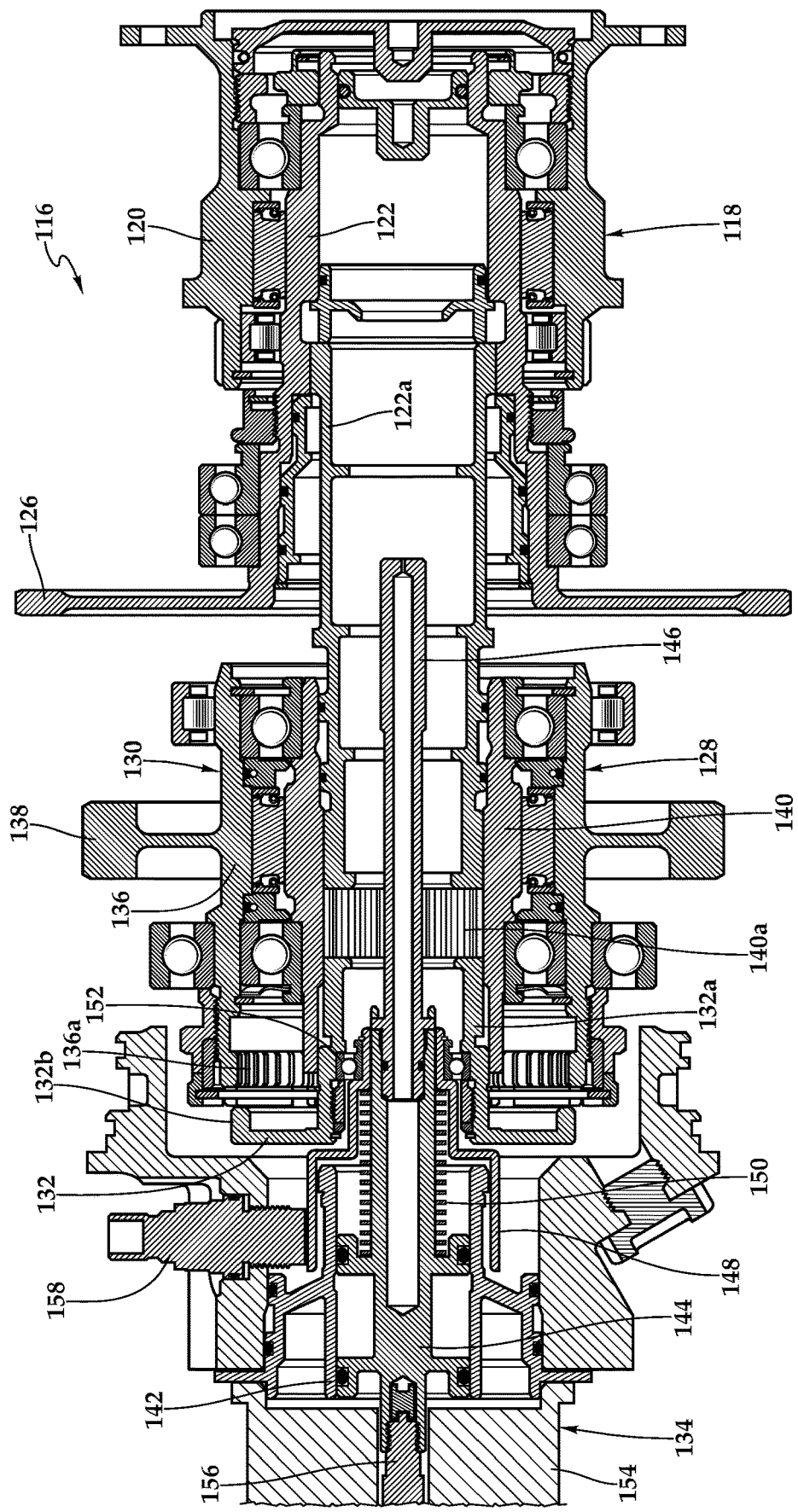
FIGS. 3A-3C are cross sectional views of a rotorcraft gearbox assembly including a multimode clutch assembly in various operating configurations in accordance with embodiments of the present disclosure.

Referring additionally to FIG. 3A, secondary gearbox 116 includes a freewheeling unit depicted as sprag clutch 118 that acts as a one-way clutch enabling a driving mode in which torque from secondary engine 114 is coupled through sprag clutch 118 from an input race 120 to an output race 122. In the illustrated embodiment, output race 122 is coupled to an output gear 126 that provides power to accessories 124 such as one or more generators, air pumps, oil pumps, hydraulic systems and the like. Sprag clutch 118 has an overrunning mode in which secondary engine 114 is decoupled from torque transfer through sprag clutch 118 when the rotating speed of input race 120 is less than the rotating speed of output race 122. Operating sprag clutch 118 in the overrunning mode allows, for example, main engine 102 to drive accessories 124 when secondary engine 114 is in standby mode or not operating, as discussed herein.

Secondary gearbox 116 includes a multimode clutch assembly 128 that is coaxially aligned with sprag clutch 118 and secondary engine 114, in the illustrated embodiment. In other embodiments, multimode clutch assembly 128 may operate on a separate axis than sprag clutch 118 and/or secondary engine 114. Multimode clutch assembly 128 has a unidirectional torque transfer mode and a bidirectional torque transfer mode. In the illustrated embodiment, multimode clutch assembly 128 includes a freewheeling unit depicted as sprag clutch 130, a bypass assembly 132 and an actuator assembly 134. Sprag clutch 130 has an input race 136 that is coupled to main rotor gearbox 106 via the tail rotor drive shaft and one or more gears including input gear 138. Sprag clutch 130 has an output race 140 that is coupled to output race 122 of sprag clutch 118 via shaft 122a. Shaft 122a has outer splines (not visible) that are coupled to inner splines 140a of output race 140. Likewise, shaft 122a has outer splines (not visible) that are coupled to inner splines (not visible) of output race 122. Sprag clutch 130 may act as a one-way clutch enabling a driving mode in which torque from the main drive system is coupled through sprag clutch 130 from input race 136 to output race 140. Sprag clutch 130 also has an overrunning mode in which the main drive system is decoupled from torque transfer with sprag clutch 130 when the rotating speed of input race 136 is less than the rotating speed of output race 140 of sprag clutch 130. When sprag clutch 130 is acting as a one-way clutch, multimode clutch assembly 128 is in its unidirectional torque transfer mode. In the unidirectional torque transfer mode of multimode clutch assembly 128, torque can be driven from the main drive system through secondary gearbox 116 but torque cannot be driven from secondary gearbox 116 to the main drive system of powertrain 100.

Figure 3B:
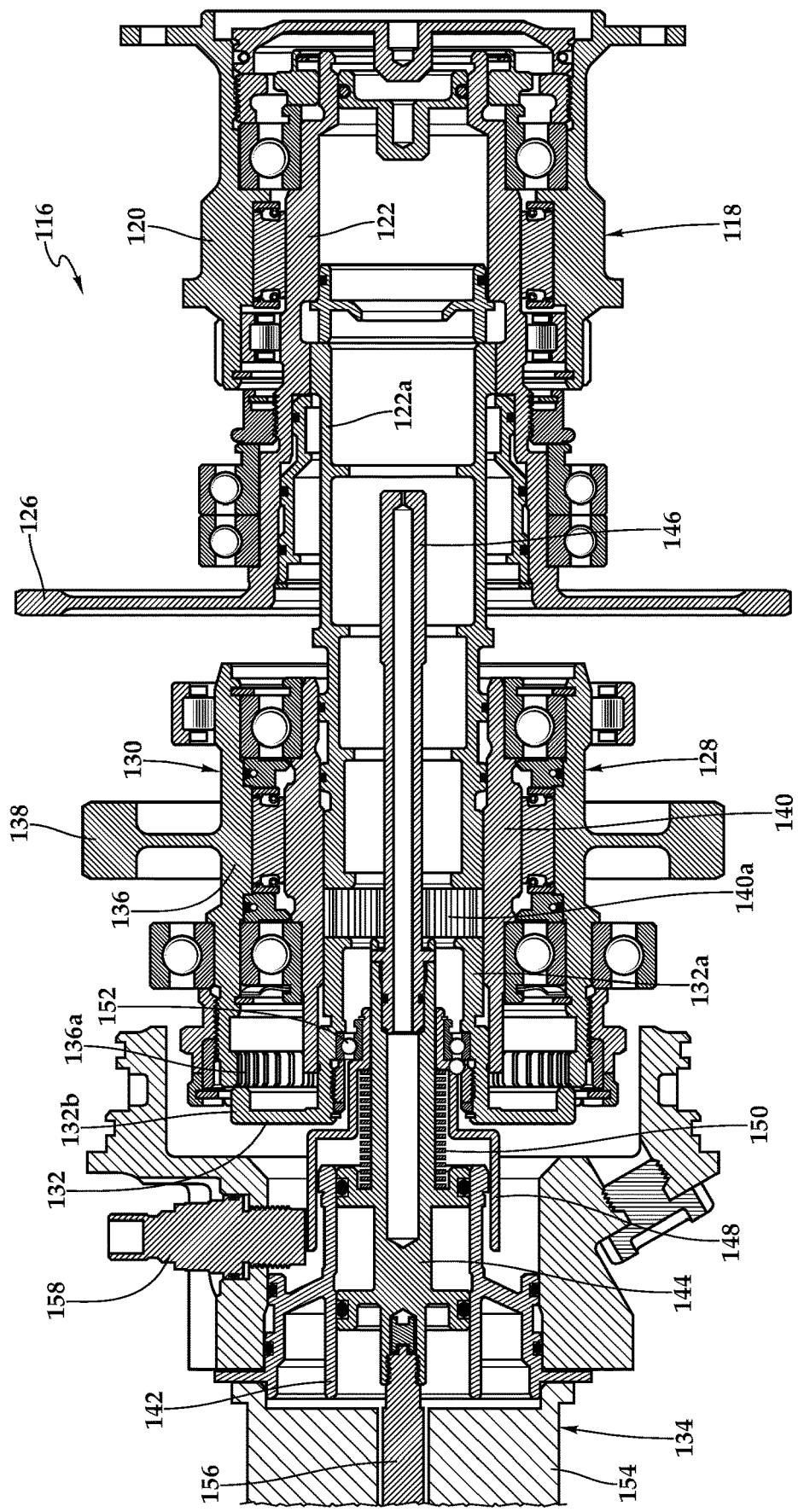
Figure 3C:
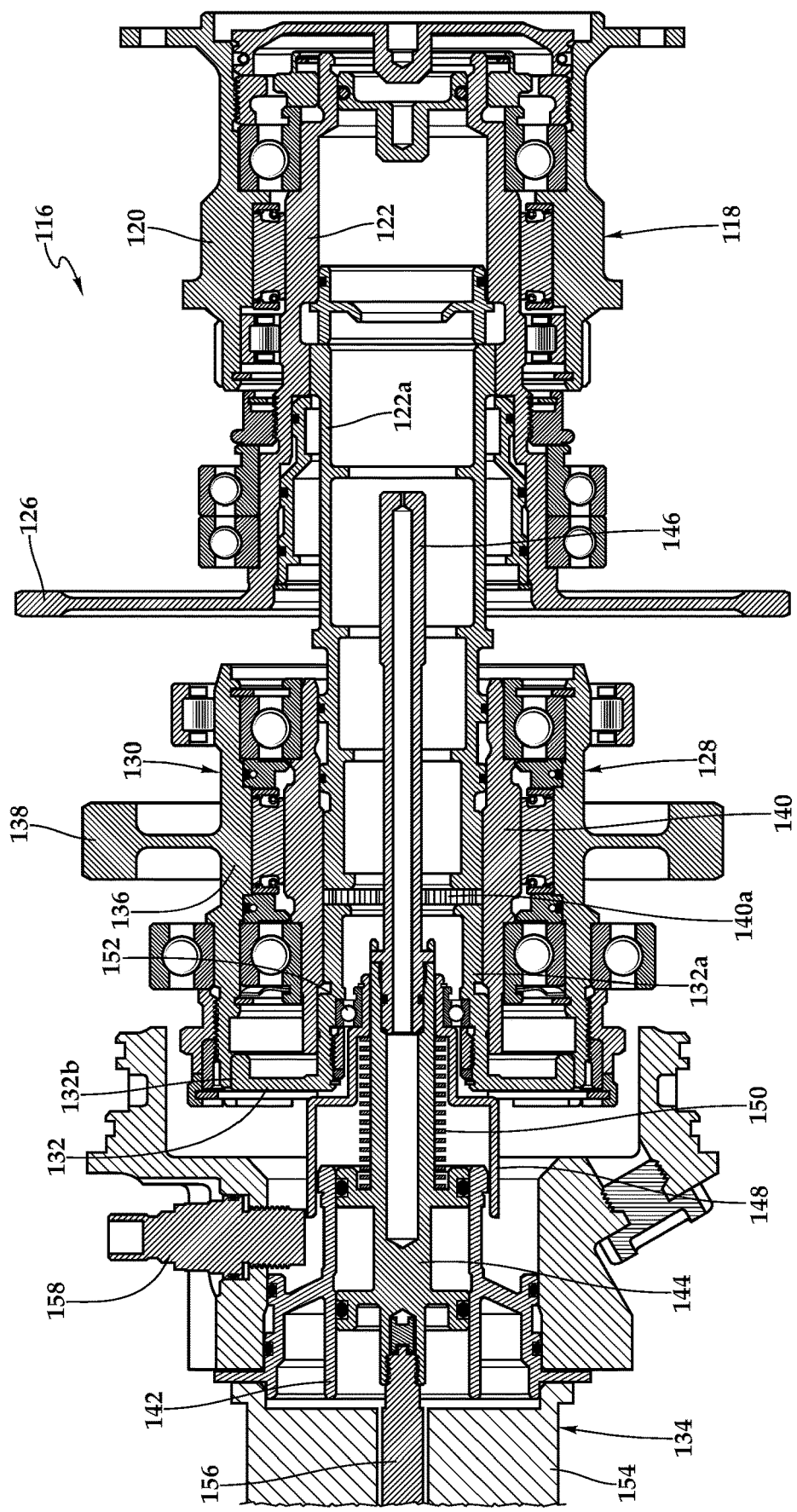

Referring additionally to FIG. 3C, the overrunning mode of multimode clutch assembly 128 can be disabled by engaging bypass assembly 132 to couple input race 136 and output race 140 of sprag clutch 130 to functionally form a connected shaft. In this configuration with bypass assembly 132 preventing sprag clutch 130 from operating in the overrunning mode, multimode clutch assembly 128 is in its bidirectional torque transfer mode. In the bidirectional torque transfer mode of multimode clutch assembly 128, torque can be driven from the main drive system through secondary gearbox 116 and torque can be driven from secondary gearbox 116 to the main drive system of powertrain 100.

Multimode clutch assembly 128 is operated between the unidirectional and bidirectional torque transfer modes by shifting bypass assembly 132 between its disengaged position (FIG. 3A) and its engaged position (FIG. 3C). The operations of engaging and disengaging bypass assembly 132 may be pilot controlled and/or may be automated by the flight control computer of helicopter 10 and may be determined according to the operating conditions of helicopter 10. In the illustrated embodiment, bypass assembly 132 is shifted between the engaged and disengaged positions responsive to engagement and disengagement forces supplied by actuator assembly 134, which may be generated mechanically, electrically, hydraulically, pneumatically and/or combinations thereof or by other suitable actuation signaling means.

In the illustrated embodiment, actuator assembly 134 includes an actuator liner 142 that is fixed relative to the housing of secondary gearbox 116. A piston 144 is slidably and sealingly received within actuator liner 142. In the illustrated embodiment, piston 144 is coupled to a piston extension depicted as an oil jet 146. In other embodiments, piston 144 and oil jet 146 may be integral or oil jet 146 may be omitted. Actuator assembly 134 also includes a bearing sled 148 that is slidably received about actuator liner 142 and that slidably receives piston 144 therein. Bearing sled 148 and actuator liner 142 preferably including an anti-rotation feature that prevents relative rotation therebetween such as a tab and slot assembly wherein, for example, one or more tabs of actuator liner 142 extend radially outwardly into slots of bearing sled 148 or wherein one or more tabs of bearing sled 148 extend radially inwardly into slots of actuator liner 142 (not pictured). In the illustrated embodiment, a mechanical biasing element depicted as wave spring 150 is positioned between a shoulder of piston 144 and a shoulder bearing sled 148. A bearing assembly depicted as a ball bearing set 152 couples bearing sled 148 with bypass assembly 132 such that bypass assembly 132 translates with bearing sled 148 and is rotatable relative to bearing sled 148 as well as the other components of actuator assembly 134. In the illustrated embodiment, the inner race of ball bearing set 152 has an anti-rotation coupling with bearing sled 148. In addition, actuator assembly 134 includes an actuator 154 having a cylinder 156 that is shiftable responsive to an electric signal, a hydraulic signal, a pneumatic signal or the like. When actuator 154 is electrically signaled, actuator 154 may be referred to herein as an electric switch. When actuator 154 is hydraulically or pneumatically signaled, actuator 154 may be referred to herein as a pressure switch and more precisely a hydraulic switch or a compressed air switch, respectively. Operation of cylinder 156 by actuator 154 causes piston 144 to shift relative to actuator liner 142 between first and second positions. Shifting of piston 144 causes bypass assembly 132 to shift between engaged and disengaged positions with sprag clutch 130. More specifically, bypass assembly 132 includes a shaft 132a having outer splines (not visible) and a ring gear 132b having outer splines (not visible). The outer splines of shaft 132a are in mesh with inner splines 140a of output race 140 of sprag clutch 130 such that when output race 140 is rotating, bypass coupling 132 also rotates. The outer splines of ring gear 132b are selectively engaged with and disengaged from inner splines 136a of input race 136 to operate multimode clutch assembly 128 between the unidirectional and bidirectional torque transfer modes.

Returning to FIGS. 2A-2E, operating scenarios for helicopter 10 will now be described. In FIG. 2A, powertrain 100 is in a preflight configuration in which main engine 102 is not yet operating as indicated by the dashed lines between the components of the main drive system. As the main drive system is not turning, no torque is being applied to secondary gearbox 116 from the main drive system as indicated by the dashed line therebetween. Prior to starting secondary engine 114, an engagement status of multimode clutch assembly 128 should be checked. In the illustrated embodiment, an engagement status sensor includes three circumferentially distributed inductive proximity sensors 158 (only one being visible in FIGS. 3A-3C) that are used to determine the engagement status of bypass assembly 132 by measuring the position of bearing sled 148 relative to proximity sensors 158 by detecting the presence or absence of the metal of bearing sled 148 adjacent to the faces of proximity sensors 158. For example, as best seen in FIG. 3C, proximity sensors 158 detect the absence of bearing sled 148 relative thereto indicating bypass assembly 132 is in the engaged position. In addition, as best seen in FIGS. 3A and 3B, proximity sensors 158 detect the presence of bearing sled 148 relative thereto indicating bypass assembly 132 is not in the engaged position. In other embodiments, other numbers of proximity sensors 158 in other orientations may be used. In still other embodiments, other types of engagement status sensors may be used to determine the engagement status of bypass assembly 132, as will be discussed herein. In addition to determining the engagement status of bypass assembly 132 in preflight, the use of an engagement status sensor is also beneficial in determining, for example, a malfunction of actuator assembly 134, breakage of wave spring 150, partial engagement or disengagement of bypass assembly 132, disengagement of bypass assembly 132 during flight, disengagement of bypass assembly 132 under torque, engagement of bypass assembly 132 at a differential speed relative to outer race 136 as well as other undesirable conditions.

Following the status check, if multimode clutch assembly 128 is not in the unidirectional torque transfer mode with bypass assembly 132 in the disengaged position, actuator 154 provides a suitable disengagement signal (hydraulic, pneumatic, electric) to operate cylinder 156 and shift piston 144 to the position shown in FIG. 3A, thereby shifting bypass assembly 132 to the disengaged position. It is noted that in the disengaged position, contact between bypass assembly 132 and the housing of secondary gearbox 116 is prevented by bearing sled 148. Another status check may now be performed. Following the status check, if multimode clutch assembly 128 is in the unidirectional torque transfer mode with bypass assembly 132 is in the disengaged position, secondary engine 114 may be started such that secondary engine 114 provides torque and rotational energy within the secondary drive system, as indicated by the arrows between secondary engine 114, secondary gearbox 116 and accessories 124, in FIG. 2A. More specifically, secondary engine 114 is driving input race 120 of sprag clutch 118, which causes output race 122 of sprag clutch 118 to drive output gear 126 which in turn provides power to accessories 124. It is noted that rotation of output race 122 causes rotation of shaft 122a which in turn causes rotation of output race 140 of sprag clutch 130, which is operation in its overrunning mode. In addition, rotation of shaft 122a causes rotation bypass assembly 132 via inner splines 140a. While operating in the preflight configuration, the pilot of helicopter 10 can proceed through the startup procedure. Prior to starting main engine 102, the status of multimode clutch assembly 128 may be checked again using proximity sensors 158. This process step provides further assurance that bypass assembly 132 is secured in the disengaged position prior to starting main engine 102.

Figure 2B:
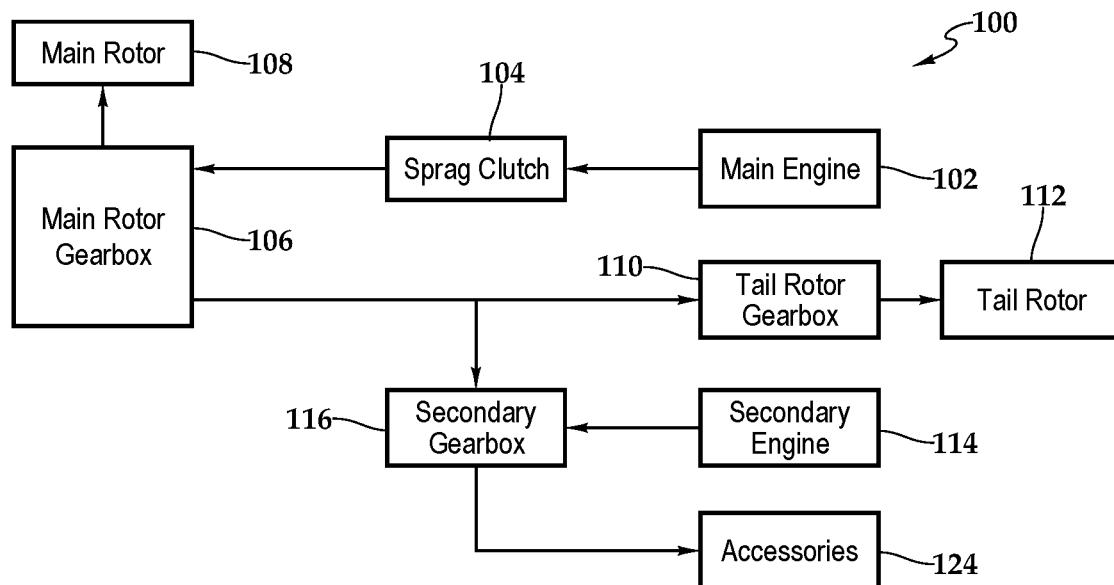
Figure 2C:
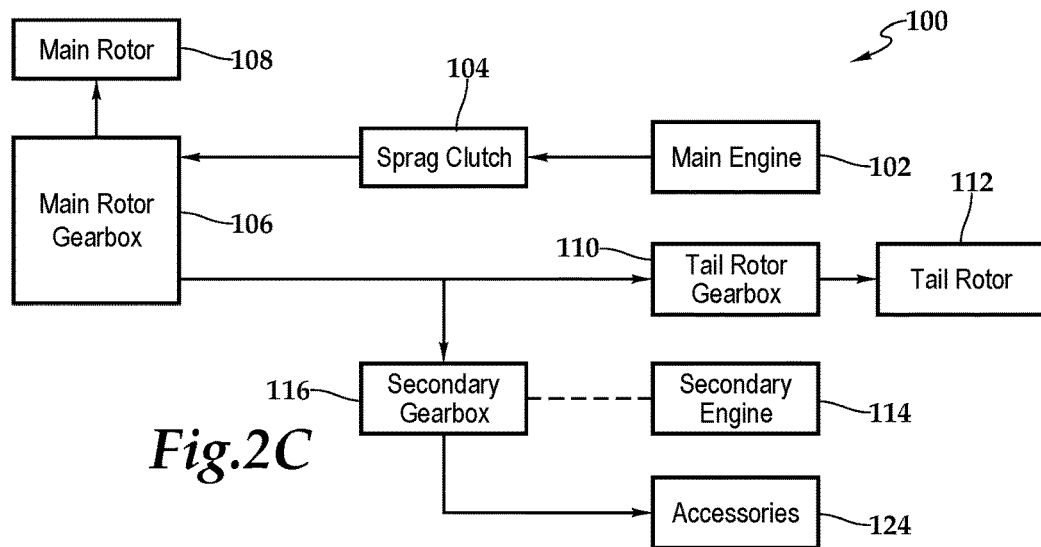
Figure 2D:
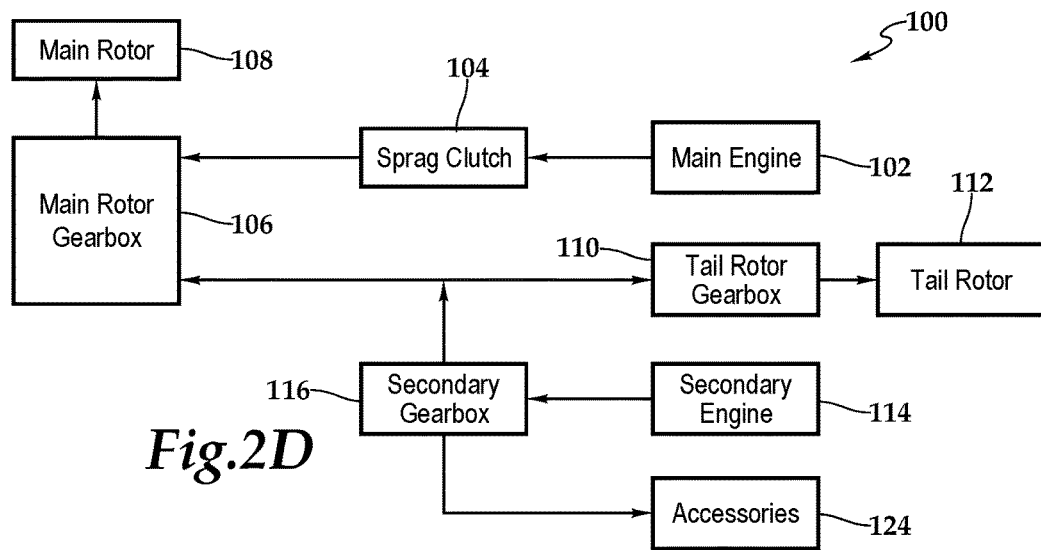
Figure 2E:
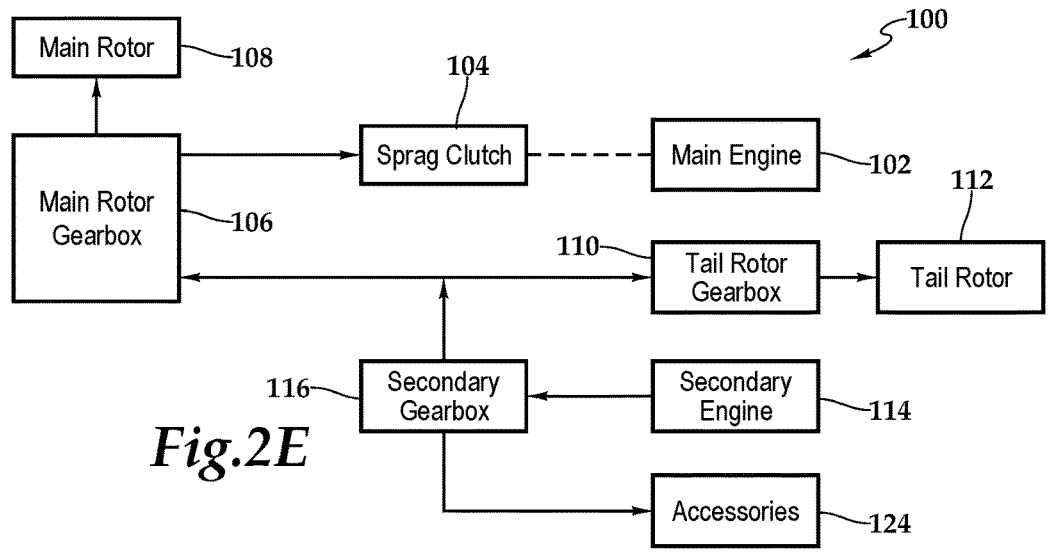

Once main engine 102 is started, torque is delivered through the main drive system as indicated by the arrows between the components within the main drive system, as best seen in FIG. 2B. In addition, the main drive system may supply torque to secondary gearbox 116, as indicated by the arrow therebetween. When power is applied to input race 136 of sprag clutch 130 via input gear 138 from the main drive system such that input race 136 and output race 140 of sprag clutch 130 are turning together at the same speed, multimode clutch assembly 128 may be operated from the unidirectional torque transfer mode to the bidirectional torque transfer mode. Specifically, bypass assembly 132 can now be shifted from the disengaged position to the engaged position responsive to pilot input and/or operation of the flight control computer of helicopter 10. In the illustrated embodiment, actuator 154 provides a suitable engagement signal (hydraulic, pneumatic, electric) to operate cylinder 156 and shift piston 144 to the position shown in FIG. 3B. In the illustrated configuration, the movement of piston 144 relative to actuator liner 142 and bearing sled 148 has compressed wave spring 150 between piston 144 and bearing sled 148 due to contact between the faces of the outer splines of ring gear 132b and inner splines 136a of input race 136. Wave spring 150 assists in overcoming such misalignment in the clocking of the outer splines of ring gear 132b and inner splines 136a of input race 136 by allowing full actuation of piston 144 while maintaining pressure between ring gear 132b and input race 136 so that when bypass assembly 132 and input race 136 start to rotate relative to each other, the outer splines of ring gear 132b will mesh with inner splines 136a of input race 136, thereby shifting bypass assembly 132 to the engaged position and multimode clutch assembly 128 to the bidirectional torque transfer mode, as best seen in FIG. 3C.

If the outer splines of ring gear 132b and inner splines 136a of input race 136 are aligned prior to operating cylinder 156, bypass assembly 132 may be shifted directly from the disengaged position (FIG. 3A) to the engaged position (FIG. 3C) without compressing spring 150 or being in the intermediate position depicted in FIG. 3B. In the bidirectional torque transfer mode of multimode clutch assembly 128, when input race 136 of sprag clutch 130 is driven by the main drive system, bypass assembly 132 and output race 140 rotate therewith. In addition, when output race 140 of sprag clutch 130 is driven by secondary engine 114, bypass assembly 132 and input race 136 rotate therewith to supply power to main drive system, thereby bypassing the overrunning mode of sprag clutch 130 such that multimode clutch assembly 128 operates with the functionality of a connected shaft. Actuator assembly 134 preferably has a suitable locking mechanism to maintain bypass assembly 132 in the engaged position until it is desired to shift bypass assembly 132 to the disengaged position.

In the engaged position, bypass assembly 132 couples input race 136 with output race 140 such that multimode clutch assembly 128 is in the bidirectional torque transfer mode. In this configuration, secondary engine 114 may be operated in standby mode or powered down as indicated by the dashed line between secondary engine 114 and secondary gearbox 116 in FIG. 2C, such that main engine 102 is driving not only the main drive system but also accessories 124, as indicated by the arrows to secondary gearbox 116 and accessories 124. This configuration of powertrain 100 may be referred to as a high efficiency configuration. In addition, secondary engine 114 may be operated to provide supplemental power to the main drive system as indicated by the arrow between secondary gearbox 116 and the tail rotor drive shaft in FIG. 2D. This configuration of powertrain 100 may be referred to as an enhanced power configuration.

Continuing with the operating scenarios of helicopter 10, once multimode clutch assembly 128 is in the bidirectional torque transfer mode, helicopter 10 is ready for takeoff. Assuming a high power demand takeoff and/or hover, powertrain 100 is preferably in the enhanced power configuration of FIG. 2D for takeoff. Once helicopter 10 has completed the takeoff and is flying at a standard speed cruise, it may be desirable to place secondary engine 114 in standby mode such as idle operations or even shut secondary engine 114 down to operate helicopter 10 in the high efficiency configuration depicted in FIG. 2C. In this configuration, secondary engine 114 provide no power as indicated by the dashed line between secondary engine 114 and secondary gearbox 116 with torque and rotational energy being provided by main engine 102 through the main drive system to secondary gearbox 116 and accessories 124. More specifically, power from the main drive system is transferred through multimode clutch assembly 128 to output gear 126 by input race 136 and output race 140 that are coupled together by bypass assembly 132 then by shaft 122a and output race 122 of sprag clutch 118. Rotational energy is not sent to input race 120, as sprag clutch 118 is operating in its overrunning mode. Thus, in addition to powering main rotor 108 and tail rotor 112, in the high efficiency configuration of powertrain 100, main engine 102 also powers accessories 124.

It should be noted that multimode clutch assembly 128 is preferably maintained in its bidirectional torque transfer mode during all flight operations. For example, having multimode clutch assembly 128 in its bidirectional torque transfer mode is a safety feature of helicopter 10 in the event of a failure in main engine 102 during flight, as indicated by the dashed lines between main engine 102 and sprag clutch 104 in FIG. 2E. In this case, an autorotation maneuver may be performed in which the descent of helicopter 10 creates an aerodynamic force on main rotor 108 as air moves up through main rotor 108 generating rotational inertia. Upon final approach during the autorotation landing, helicopter 10 performs a flare recovery maneuver in which the kinetic energy of main rotor 108 is converted into lift using aft cyclic control. Both the autorotation maneuver and the flare recovery maneuver are enhanced by operating secondary engine 114 and sending power through secondary gearbox 116 to the main drive system, as indicated by the arrow therebetween, and more particularly by sending power to main rotor 108 as indicated by the arrows leading thereto. It is noted that rotational energy is also sent to sprag clutch 104, which is operating in its overrunning mode while main engine 102 is not operating. This configuration may be referred to as the enhanced autorotation configuration of powertrain 100 in which main engine 102 is not operating but secondary engine 114 is providing power to main rotor 108 through multimode clutch assembly 128, which is in the bidirectional torque transfer mode.

Continuing with the operating scenarios of helicopter 10, after a conventional landing, when it is desired to operate multimode clutch assembly 128 from the bidirectional to the unidirectional torque transfer mode, main engine 102 continues to provide torque and rotational energy to input race 136, which in turn drives output race 140 of sprag clutch 130. Actuator 154 then provides a suitable disengagement signal (hydraulic, pneumatic, electric) to operate cylinder 156 and shift piston 144 to the position shown in FIG. 3A such that the outer splines of ring gear 132b shift out of mesh with inner splines 136a of input race 136, thereby shifting bypass assembly 132 to the disengaged position. Actuator assembly 134 preferably has a suitable locking mechanism to maintain bypass assembly 132 in the disengaged position until it is desired to shift bypass assembly 132 to the engaged position.

Figure 4A:
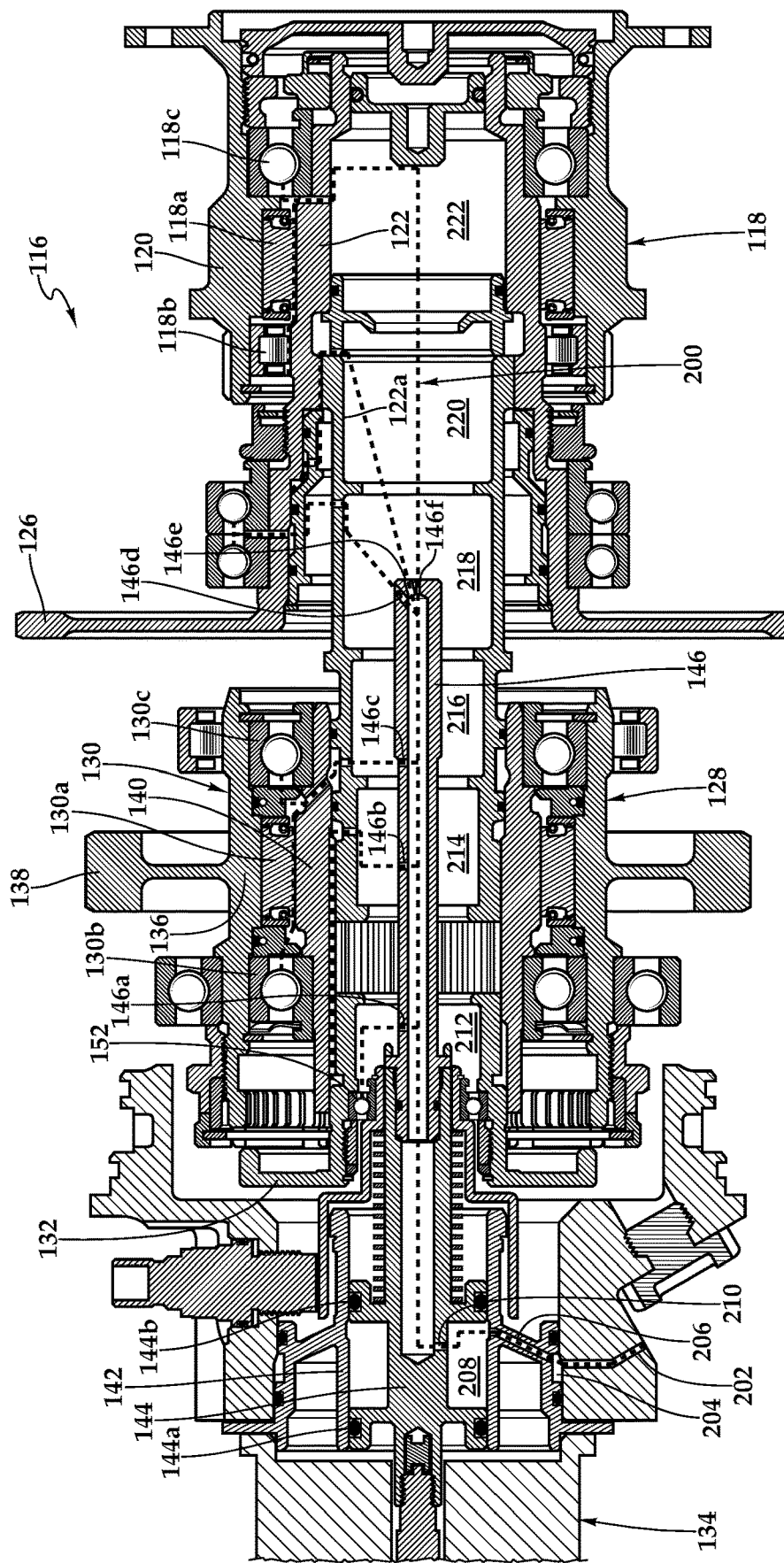
FIGS. 4A-4B are cross sectional views of a rotorcraft gearbox assembly including a multimode clutch assembly and depicting a lubrication circuit in accordance with embodiments of the present disclosure.
Figure 4B:
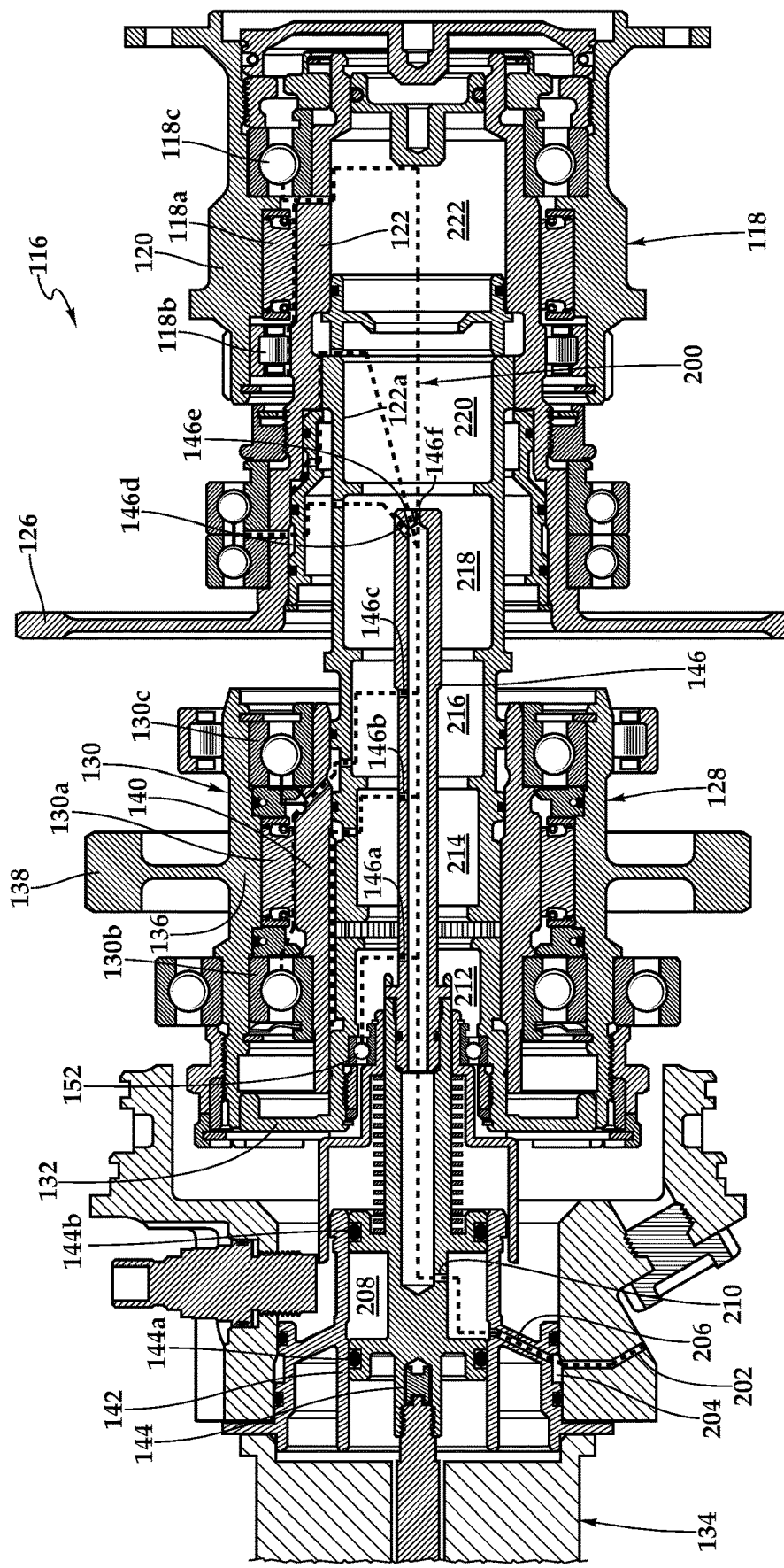

Referring next to FIGS. 4A-4B, the lubrication strategy for secondary gearbox 116 will now be described. Secondary gearbox 116 includes a lubrication circuit in which pressurized lubricating oil is depicted as heavy dashed lines 200. The lubrication circuit includes an oil pump (not pictured) that pressurizes and routes lubricating oil to secondary gearbox 116 and in particular to supply port 202. Pressurized lubricating oil 200 is then routed to an annular passageway 204 defined between the housing of secondary gearbox 116 and actuator liner 142 by a pair of seals depicted as O-rings. Actuator liner 142 includes one or more passageways 206 that route pressurized lubricating oil 200 to an annular oil chamber 208 defined between actuator liner 142 and piston 144 by a pair of seals depicted as O-rings 144a, 144b. Pressurized lubricating oil 200 then enters the interior of piston 144 via one or more ports 210 that are in fluid communication with annular oil chamber 208. From piston 144, pressurized lubricating oil 200 flows into oil jet 146 that includes a plurality of nozzles 146a, 146b, 146c, 146d, 146e, 146f. A filter or debris screen (not pictured) may be positioned within piston 144 to prevent any solids within pressurized lubricating oil 200 from entering oil jet 146 and the plugging nozzles.

Each of the nozzles directs pressurized lubricating oil 200 into a specific region within shaft 122a defined between adjacent oil dams. More specifically, one or more nozzles 146a direct pressurized lubricating oil 200 into region 212, one or more nozzles 146b direct pressurized lubricating oil 200 into region 214, one or more nozzles 146c direct pressurized lubricating oil 200 into region 216, one or more nozzles 146d direct pressurized lubricating oil 200 into region 218, one or more nozzles 146e direct pressurized lubricating oil 200 into region 220 and one or more nozzles 146f direct pressurized lubricating oil 200 into region 222. The centrifugal force generated by rotation of shaft 122a during operation of helicopter 10 aids in oil flow from the interior of shaft 122a to the desired locations within secondary gearbox 116. For example, pressurized lubricating oil 200 from region 212 flows to ball bearing set 152 for lubrication thereof. Similarly, pressurized lubricating oil 200 from region 216 flows to sprag clutch 130 to provide lubrication for the sprag elements 130a between input race 136 and output race 140 as well as for clutch bearing sets 130b, 130c. Oil dams within sprag clutch 130 keep sprag elements 130a submerged in pressurized lubricating oil 200. The oil dams may also include metering orifices that route pressurized lubricating oil 200 to clutch bearing sets 130b, 130c. Likewise, pressurized lubricating oil 200 from region 222 flows to sprag clutch 118 to provide lubrication for the sprag elements 118a between input race 120 and output race 122 as well as for clutch bearing sets 118b, 118c. Oil dams within sprag clutch 118 keep sprag elements 118a submerged in pressurized lubricating oil 200. The oil dams may also include metering orifices that route pressurized lubricating oil 200 to clutch bearing sets 118b, 118c. Importantly, lubrication circuit integrity is maintained when bypass assembly 132 is shifted between the engaged and disengaged positions as the oil inlet to annular oil chamber 208 remains between O-ring 144a, 144b as piston 144 shifts within actuator liner 142 between the disengaged position of bypass assembly 132 (FIG. 4A) and the engaged position of bypass assembly 132 (FIG. 4B).

As discussed herein, multimode clutch assembly 128 is preferably maintained in its bidirectional torque transfer mode during all flight operations. This is achieved in the embodiment depicted in FIGS. 5A-5B using a mechanical biasing element that maintains bypass assembly 132 in the engaged position unless a disengagement force sufficient to overcome the engagement force of the mechanical biasing element is applied. Specifically, a secondary gearbox 300 includes sprag clutch 118 having input race 120 and output race 122 which is coupled to output gear 126 that provides power to accessories 124. Secondary gearbox 300 also includes a multimode clutch assembly 128 that is coaxially aligned with sprag clutch 118. Multimode clutch assembly 128 has a unidirectional torque transfer mode and a bidirectional torque transfer mode. Multimode clutch assembly 128 includes sprag clutch 130, bypass assembly 132 and an actuator assembly 302. Sprag clutch 130 includes input race 136 that is coupled to main rotor gearbox 106 via the tail rotor drive shaft and one or more gears including input gear 138. Sprag clutch 130 includes output race 140 that is coupled to output race 122 of sprag clutch 118 via shaft 122a. Sprag clutch 130 may act as a one-way clutch enabling a driving mode in which torque from the main drive system is coupled through sprag clutch 130 from input race 136 to output race 140. Sprag clutch 130 also has an overrunning mode in which the main drive system is decoupled from torque transfer with sprag clutch 130 when the rotating speed of input race 136 is less than the rotating speed of output race 140 of sprag clutch 130. When sprag clutch 130 is acting as a one-way clutch, multimode clutch assembly 128 is in its unidirectional torque transfer mode. In the unidirectional torque transfer mode of multimode clutch assembly 128, torque can be driven from the main drive system through secondary gearbox 300 but torque cannot be driven from secondary gearbox 300 to the main drive system of powertrain 100.

The overrunning mode of multimode clutch assembly 128 can be disabled by engaging bypass assembly 132 to couple input race 136 and output race 140 of sprag clutch 130 to functionally form a connected shaft. In this configuration with bypass assembly 132 preventing sprag clutch 130 from operating in the overrunning mode, multimode clutch assembly 128 is in its bidirectional torque transfer mode. In the bidirectional torque transfer mode of multimode clutch assembly 128, torque can be driven from the main drive system through secondary gearbox 300 and torque can be driven from secondary gearbox 300 to the main drive system of powertrain 100.

Figure 5A:
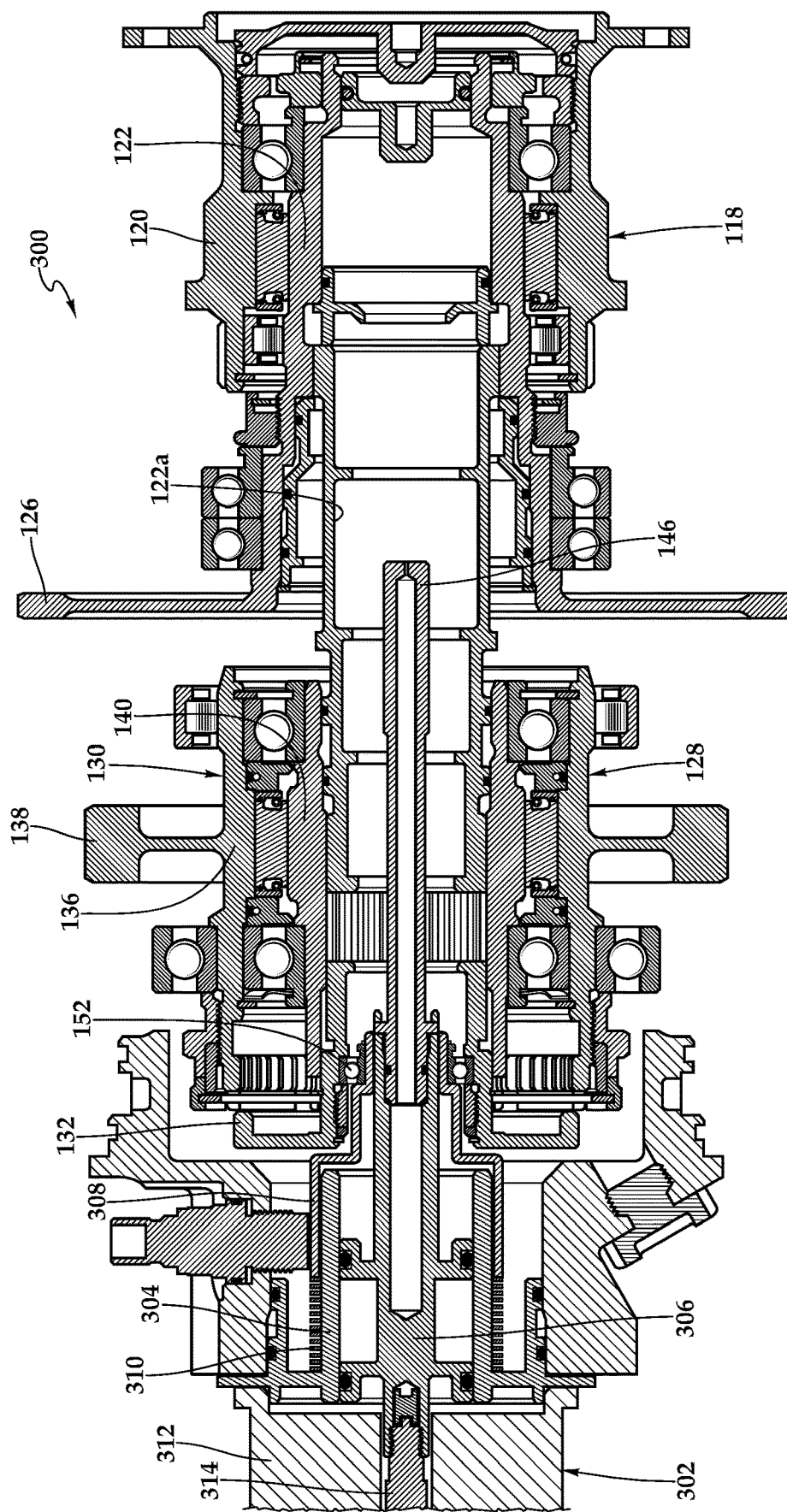
FIGS. 5A-5B are cross sectional views of a rotorcraft gearbox assembly including a multimode clutch assembly in various operating configurations in accordance with embodiments of the present disclosure.
Figure 5B:
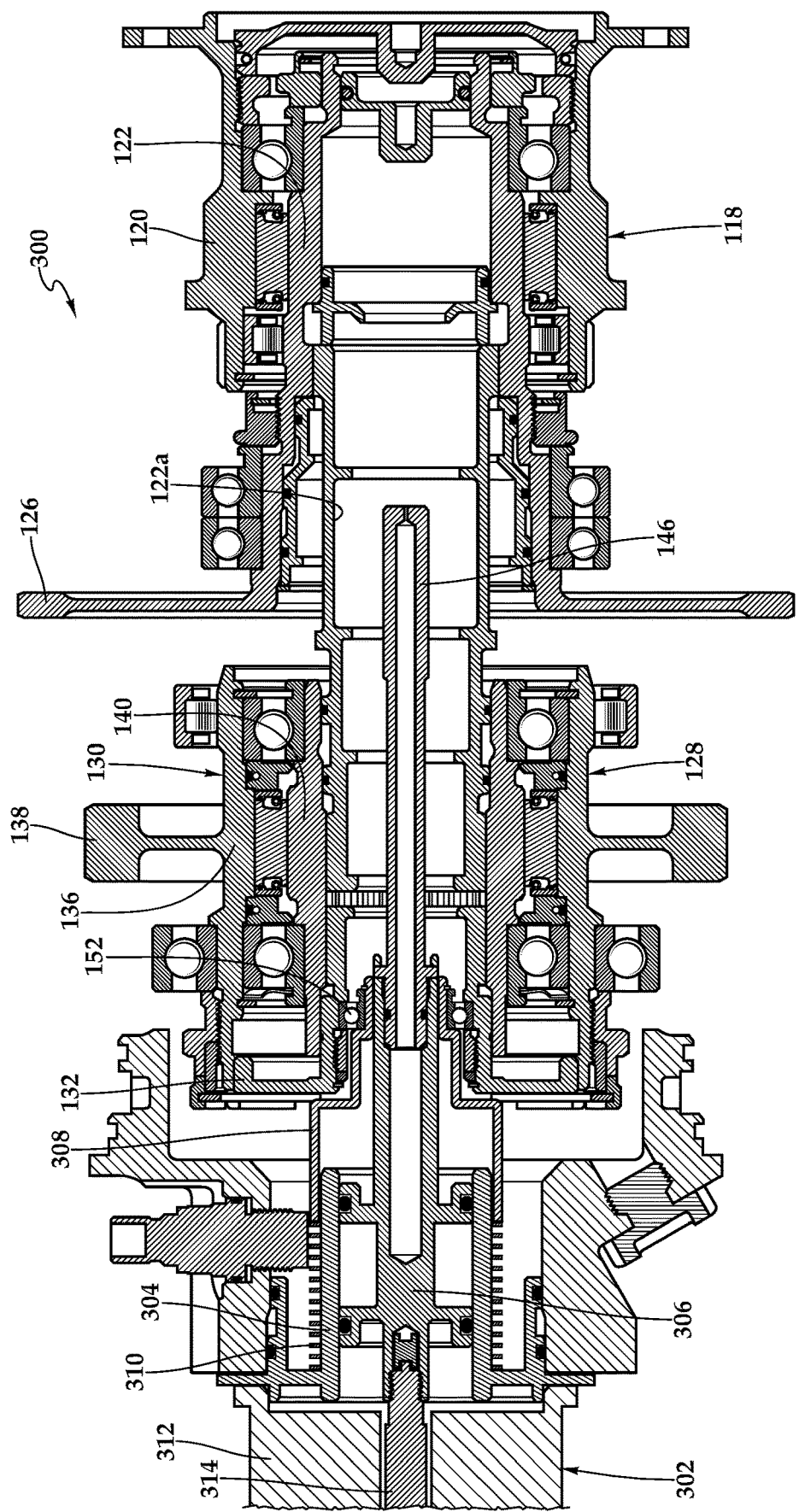

Multimode clutch assembly 128 is operated between the unidirectional and bidirectional torque transfer modes by shifting bypass assembly 132 between its disengaged position (FIG. 5A) and its engaged position (FIG. 5B). The operations of engaging and disengaging bypass assembly 132 may be pilot controlled and/or may be automated by the flight control computer of helicopter 10 and may be determined according to the operating conditions of helicopter 10. In the illustrated embodiment, bypass assembly 132 is shifted between the engaged and disengaged positions responsive to engagement and disengagement forces supplied by actuator assembly 302.

Actuator assembly 302 includes an actuator liner 304 that is fixed relative to the housing of secondary gearbox 300. A piston 306 is slidably and sealingly received within actuator liner 304. In the illustrated embodiment, piston 306 is coupled to a piston extension depicted as oil jet 146. Actuator assembly 302 also includes a bearing sled 308 that is slidably received about actuator liner 304. Bearing sled 308 is coupled to piston 306 to prevent relative translation therebetween and thus, may be considered part of piston 306. In the illustrated embodiment, a mechanical biasing element depicted as wave spring 310 is positioned between a shoulder of actuator liner 304 and an end of bearing sled 308. A bearing assembly depicted as ball bearing set 152 couples bearing sled 308 with bypass assembly 132 such that bypass assembly 132 is rotatable relative to bearing sled 308 as well as the other components of actuator assembly 302. In addition, actuator assembly 302 includes an actuator 312 having a cylinder 314 that is shiftable responsive to an electric signal, a hydraulic signal, a pneumatic signal or the like. In the illustrated embodiment, actuator assembly 302 has an energized configuration in which cylinder 314 is retracted, as depicted in FIG. 5A, and an unenergized or default configuration in which cylinder 314 is released, as depicted in FIG. 5B.

When actuator 312 is not activated, the biasing force generated by wave spring 310 acts on bearing sled 308 and serves as an engagement force to shift bypass assembly 132 from the disengaged position (FIG. 5A) to the engaged position (FIG. 5B). In addition, once bypass assembly 132 is in the engaged position, the biasing force generated by wave spring 310 continues to act on bearing sled 308 to maintain the engagement force on bypass assembly 132, thereby preventing bypass assembly 132 from shifting out of the engaged position. The use of actuator assembly 302 with wave spring 310 makes multimode clutch assembly 128 a mechanically failsafe multimode clutch assembly that remains in the bidirectional torque transfer mode even if a failure occurs in a related electric, hydraulic and/or pneumatic system. When helicopter 10 has landed and it is desired to shift bypass assembly 132 from the engaged position (FIG. 5B) to the disengaged position (FIG. 5A), actuator 312 is energized with the appropriate electric signal, hydraulic signal, pneumatic signal or the like to generate a disengagement force that overcomes the engagement force of wave spring 310 causing cylinder 314 to shift piston 306 relative to actuator liner 304 which compresses wave spring 310 between actuator liner 304 and bearing sled 308 and shifts bypass assembly 132 to the disengaged position. In the illustrated embodiment, actuator 312 must remain energized to overcome the engagement force of wave spring 310. Actuator assembly 302 may have a suitable locking mechanism to secure bypass assembly 132 in the disengaged position until it is desired to shift bypass assembly 132 to the engaged position, in which case, actuator assembly 302 may be deenergized after the locking mechanism has been deployed.

Alternatively or additionally, actuator 312 may be used to provide at least a portion of the engagement force to shift bypass assembly 132 from the disengaged position (FIG. 5A) to the engaged position (FIG. 5B). For example, actuator 312 may be energized with the appropriate electric signal, hydraulic signal, pneumatic signal or the like to generate at least a portion of the engagement force that together with the biasing force generated by wave spring 310 shifts bypass assembly 132 from the disengaged position to the engaged position. In this embodiment, once bypass assembly 132 is in the engaged position, actuator 312 may be unenergized as the biasing force generated by wave spring 310 continues to act on bearing sled 308 to maintain the engagement force on bypass assembly 132, thereby preventing bypass assembly 132 from shifting out of the engaged position.

Figure 6A:
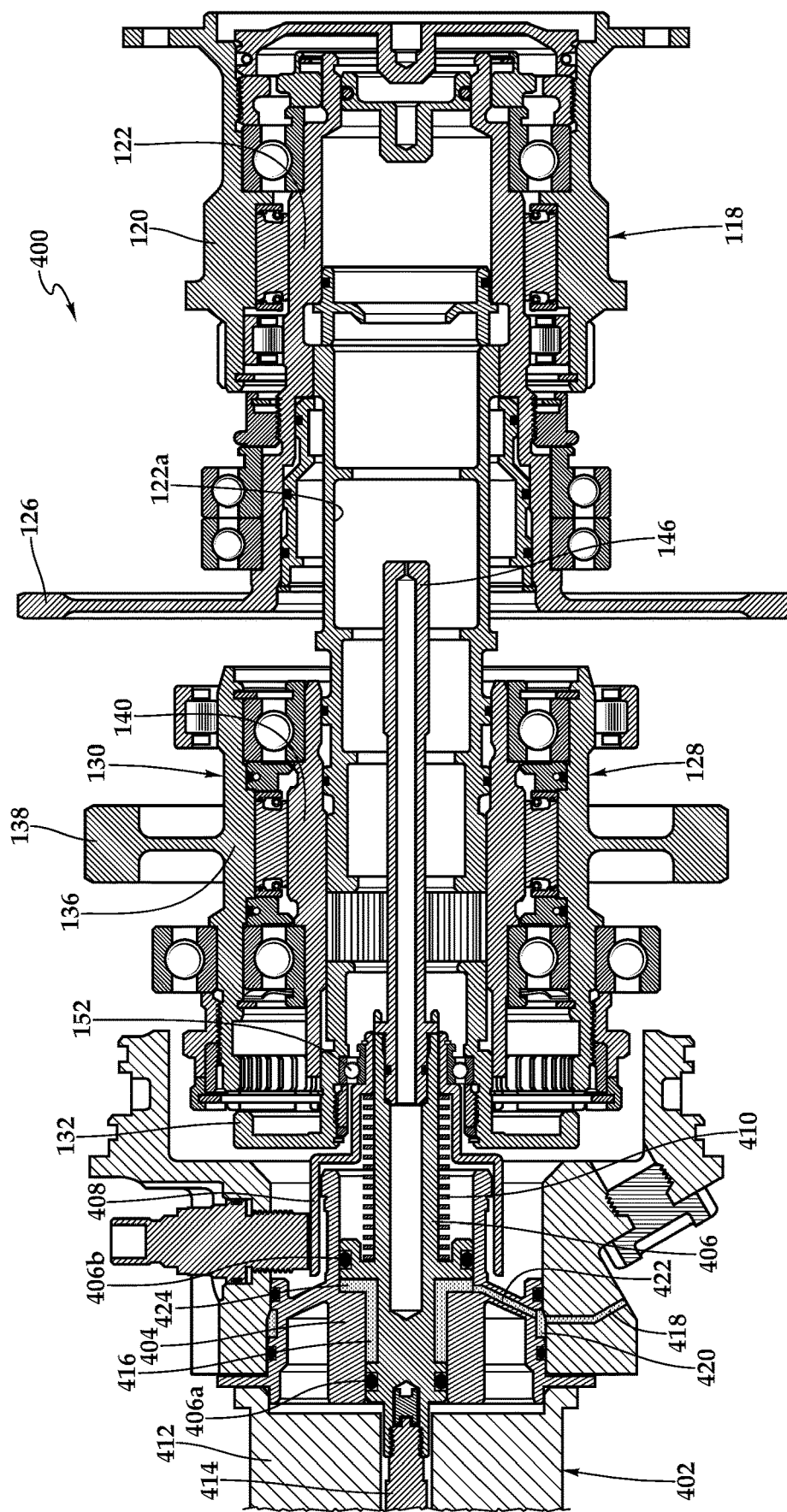
FIGS. 6A-6B are cross sectional views of a rotorcraft gearbox assembly including a multimode clutch assembly in various operating configurations in accordance with embodiments of the present disclosure.
Figure 6B:
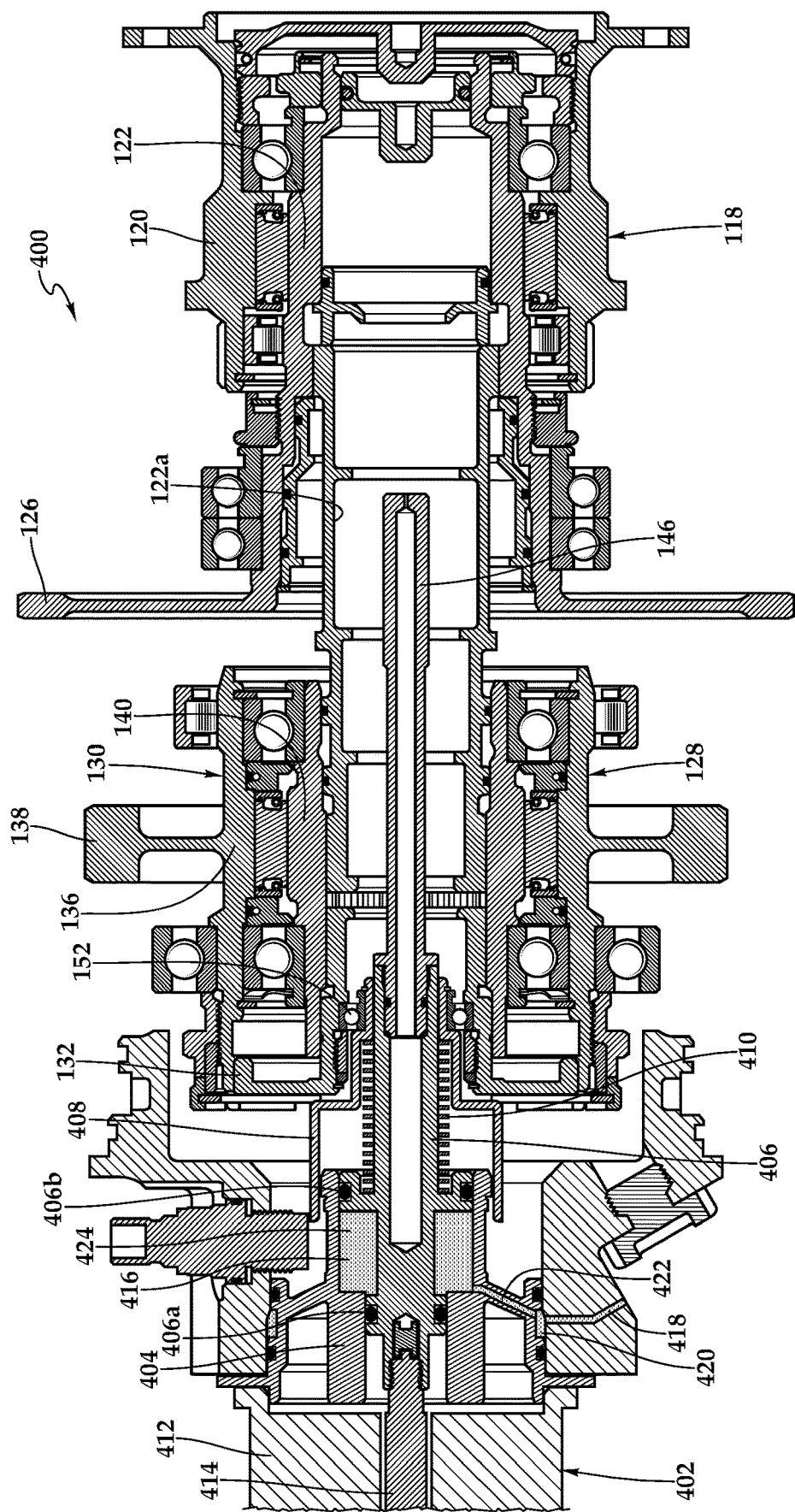

FIGS. 6A-6B depict another embodiment of a secondary gearbox that includes a failsafe multimode clutch assembly. In this embodiment, a pressurized fluid maintains bypass assembly 132 in the engaged position unless a disengagement force sufficient to overcome the engagement force of the pressurized fluid is applied. Specifically, secondary gearbox 400 includes sprag clutch 118 having input race 120 and output race 122 which is coupled to output gear 126 that provides power to accessories 124. Secondary gearbox 400 also includes a multimode clutch assembly 128 that is coaxially aligned with sprag clutch 118. Multimode clutch assembly 128 has a unidirectional torque transfer mode and a bidirectional torque transfer mode. Multimode clutch assembly 128 includes sprag clutch 130, bypass assembly 132 and an actuator assembly 402. Sprag clutch 130 includes input race 136 that is coupled to main rotor gearbox 106 via the tail rotor drive shaft and one or more gears including input gear 138. Sprag clutch 130 includes output race 140 that is coupled to output race 122 of sprag clutch 118 via shaft 122a. Sprag clutch 130 may act as a one-way clutch enabling a driving mode in which torque from the main drive system is coupled through sprag clutch 130 from input race 136 to output race 140. Sprag clutch 130 also has an overrunning mode in which the main drive system is decoupled from torque transfer with sprag clutch 130 when the rotating speed of input race 136 is less than the rotating speed of output race 140 of sprag clutch 130. When sprag clutch 130 is acting as a one-way clutch, multimode clutch assembly 128 is in its unidirectional torque transfer mode. In the unidirectional torque transfer mode of multimode clutch assembly 128, torque can be driven from the main drive system through secondary gearbox 400 but torque cannot be driven from secondary gearbox 400 to the main drive system of powertrain 100.

The overrunning mode of multimode clutch assembly 128 can be disabled by engaging bypass assembly 132 to couple input race 136 and output race 140 of sprag clutch 130 to functionally form a connected shaft. In this configuration with bypass assembly 132 preventing sprag clutch 130 from operating in the overrunning mode, multimode clutch assembly 128 is in its bidirectional torque transfer mode. In the bidirectional torque transfer mode of multimode clutch assembly 128, torque can be driven from the main drive system through secondary gearbox 400 and torque can be driven from secondary gearbox 400 to the main drive system of powertrain 100.

Multimode clutch assembly 128 is operated between the unidirectional and bidirectional torque transfer modes by shifting bypass assembly 132 between its disengaged position (FIG. 6A) and its engaged position (FIG. 6B). The operations of engaging and disengaging bypass assembly 132 may be pilot controlled and/or may be automated by the flight control computer of helicopter 10 and may be determined according to the operating conditions of helicopter 10. In the illustrated embodiment, bypass assembly 132 is shifted between the engaged and disengaged positions responsive to engagement and disengagement forces supplied by actuator assembly 402.

Actuator assembly 402 includes an actuator liner 404 that is fixed relative to the housing of secondary gearbox 400. A piston 406 is slidably and sealingly received within actuator liner 404. In the illustrated embodiment, piston 406 is coupled to a piston extension depicted as oil jet 146. Actuator assembly 402 also includes a bearing sled 408 that is slidably received about actuator liner 404 and that slidably receives piston 406 therein. In the illustrated embodiment, a mechanical biasing element depicted as wave spring 410 is positioned between a shoulder of piston 406 and a shoulder of bearing sled 408. Wave spring 410 operates in a manner similar to wave spring 150 discussed herein to assist in overcoming any misalignment in the clocking between splines of bypass assembly 132 and input race 136 during engagement operations. A bearing assembly depicted as ball bearing set 152 couples bearing sled 408 with bypass assembly 132 such that bypass assembly 132 is rotatable relative to bearing sled 408 as well as the other components of actuator assembly 402. In addition, actuator assembly 402 includes an actuator 412 having a cylinder 414 that is shiftable responsive to an electric signal, a hydraulic signal, a pneumatic signal or the like. In the illustrated embodiment, actuator assembly 402 has an energized configuration in which cylinder 414 is retracted, as depicted in FIG. 6A, and an unenergized or default configuration in which cylinder 414 is released, as depicted in FIG. 6B.

Similar to the lubrication circuit described herein with reference to FIGS. 4A-4B, secondary gearbox 400 includes a lubrication circuit that not only provides pressurized lubricating oil to various components within secondary gearbox 400 but also provides a pressure source for failsafe operations of bypass assembly 132. In particular, the lubrication circuit of secondary gearbox 400 includes an oil pump (not pictured) that pressurizes and routes lubricating oil 416 to supply port 418. Pressurized lubricating oil 416 is then routed to an annular passageway 420 defined between the housing of secondary gearbox 400 and actuator liner 404 by a pair of seals depicted as O-rings. Actuator liner 404 includes one or more passageways 422 that route pressurized lubricating oil 416 to an annular oil chamber 424 defined between actuator liner 404 and piston 406 by a pair of seals depicted as O-rings 406a, 406b. While not illustrated, pressurized lubricating oil 416 then enters the interior of piston 406 for distribution to various components via nozzles of oil jet 146, as discussed herein. In the illustrated embodiment, annular oil chamber 424 and O-rings 406a, 406b defined a differential pressure chamber as the annular area defined by O-ring 406b is larger than the annular area defined by O-ring 406a such that when pressurized lubricating oil 416 flows through annular oil chamber 424, a biasing force is generated that acts on piston 406 and serves as an engagement force to shift bypass assembly 132 from the disengaged position (FIG. 6A) to the engaged position (FIG. 6B). In addition, once bypass assembly 132 is in the engaged position, the biasing force generated by pressurized lubricating oil 416 in annular oil chamber 424 continues to act on piston 406 to maintain the engagement force on bypass assembly 132, thereby preventing bypass assembly 132 from shifting out of the engaged position.

The use of actuator assembly 402 with pressurized lubricating oil 416 in annular oil chamber 424 makes multimode clutch assembly 128 a hydraulically failsafe multimode clutch assembly that remains in the bidirectional torque transfer mode even if a failure occurs in a related electric, hydraulic and/or pneumatic system. When helicopter 10 has landed and it is desired to shift bypass assembly 132 from the engaged position (FIG. 6B) to the disengaged position (FIG. 6A), actuator 412 is energized with the appropriate electric signal, hydraulic signal, pneumatic signal or the like to generate a disengagement force that overcomes the engagement force of pressurized lubricating oil 416 in annular oil chamber 424 causing cylinder 414 to shift piston 406 relative to actuator liner 404 which in turn shifts bypass assembly 132 to the disengaged position. In the illustrated embodiment, actuator 412 must remain energized to overcome the engagement force of pressurized lubricating oil 416 in annular oil chamber 424. Actuator assembly 402 may have a suitable locking mechanism to secure bypass assembly 132 in the disengaged position until it is desired to shift bypass assembly 132 to the engaged position, in which case, actuator assembly 402 may be deenergized after the locking mechanism has been deployed.

Alternatively or additionally, actuator 412 may be used to provide at least a portion of the engagement force to shift bypass assembly 132 from the disengaged position (FIG. 6A) to the engaged position (FIG. 6B). For example, actuator 412 may be energized with the appropriate electric signal, hydraulic signal, pneumatic signal or the like to generate at least a portion of the engagement force that together with the biasing force generated by pressurized lubricating oil 416 in annular oil chamber 424 shifts bypass assembly 132 from the disengaged position to the engaged position. In this embodiment, once bypass assembly 132 is in the engaged position, actuator 412 may be unenergized as the biasing force generated by pressurized lubricating oil 416 in annular oil chamber 424 continues to act on piston 406 to maintain the engagement force on bypass assembly 132, thereby preventing bypass assembly 132 from shifting out of the engaged position.

Figure 7A:
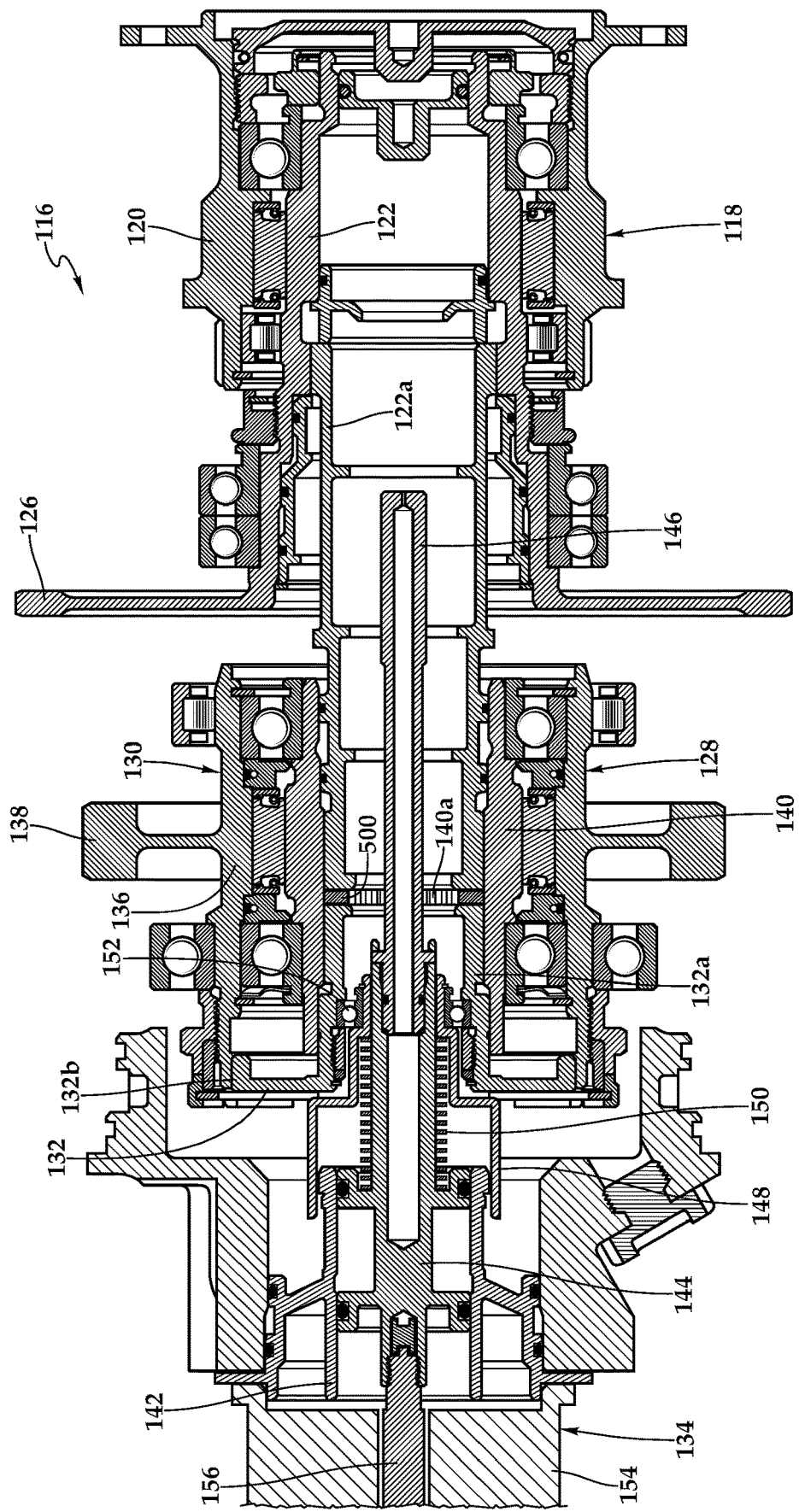
FIGS. 7A-7E are cross sectional views of a rotorcraft gearbox assembly including a multimode clutch assembly and depicting various engagement status sensors in accordance with embodiments of the present disclosure.

As discussed herein, maintaining bypass assembly 132 in the engaged position during all flight operations is an important safety feature of the present helicopter to ensure, for example, that the secondary engine can provide power to the main rotor in the event of a main engine failure. Depending upon the specific configuration of the multimode clutch assembly, a variety of engagement status sensors may be used to monitor the engagement status of the multimode clutch assembly. In one example, FIG. 7A depicts secondary gearbox 116 with bypass assembly 132 in the engaged position. In the illustrated embodiment, multimode clutch assembly 128 includes one or more proximity sensors depicted as one or more load cells 500. Load cells 500 may be coupled to an end of shaft 122a such that translation of bypass assembly 132 brings an end of shaft 132a into contact with load cells 500 when bypass assembly 132 is in the engaged position. In one example, load cells 500 may be compression load cells having strain gauges that provide an electrical signal to indicate the presence or absence of a load and/or an absolute load between a no-load condition and a full-capacity load. Such compression load cells may also be referred to herein as strain sensors. In operation, a no-load reading by load cells 500 indicates bypass assembly 132 is not in the engaged position while a load reading indicates bypass assembly 132 is in the engaged position, thereby providing the engagement status of bypass assembly 132. Alternatively, a load reading below a predetermined threshold by load cells 500 indicates bypass assembly 132 is not in the engaged position while a load reading above a predetermined threshold indicates bypass assembly 132 is in the engaged position, thereby providing the engagement status of bypass assembly 132.

Figure 7B:
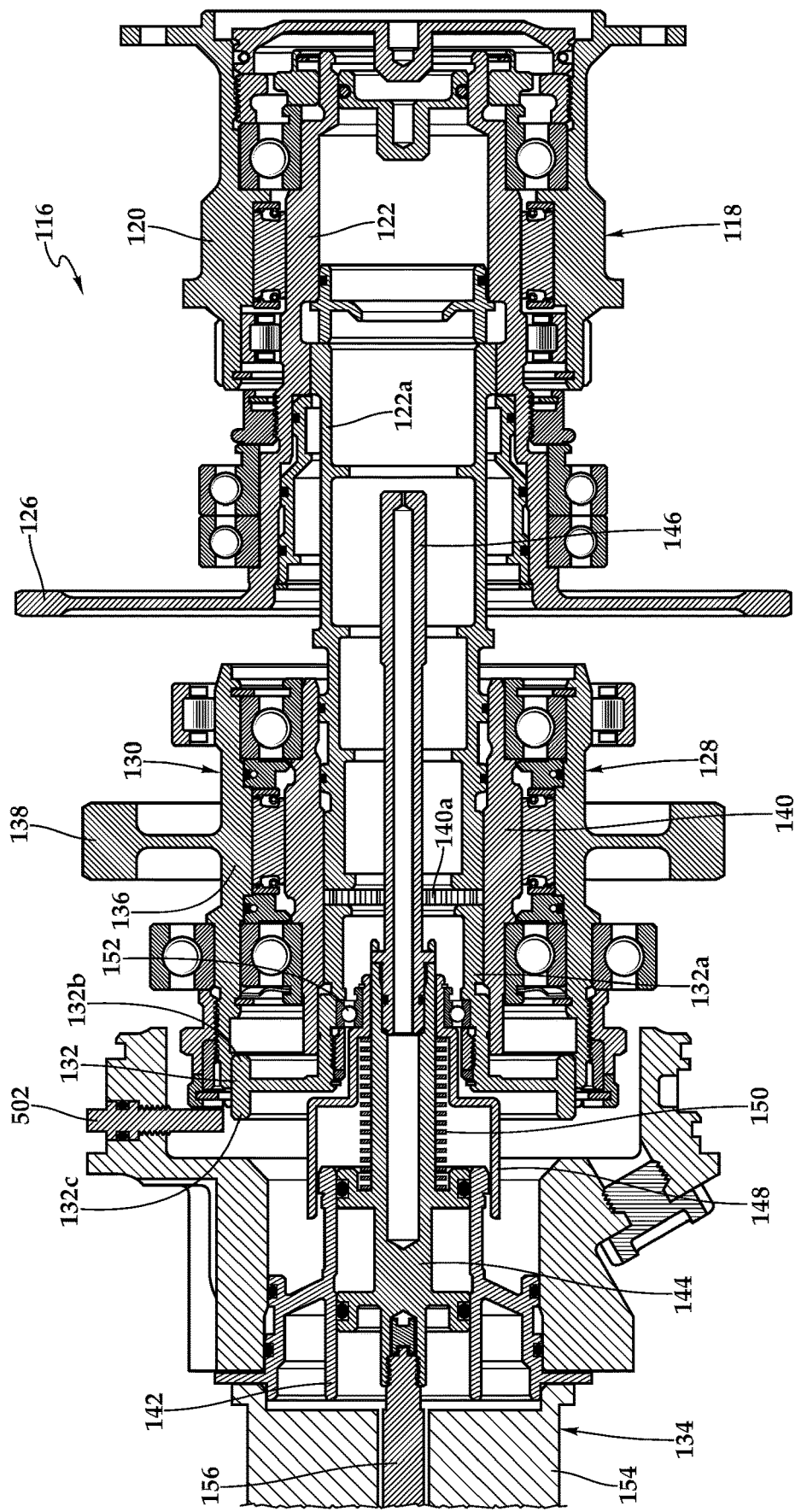

In another example, FIG. 7B depicts secondary gearbox 116 with bypass assembly 132 in the engaged position. In the illustrated embodiment, multimode clutch assembly 128 includes one or more engagement status sensors depicted as one or more tooth passage frequency sensors 502. For example, tooth passage frequency sensors 502 could be variable reluctance sensors, monopole sensors, hall-effect sensors, optical sensors or the like. In the illustrated embodiment, bypass assembly 132 includes two ring gears 132b, 132c. The number of splines on ring gear 132b is different from the number of teeth on ring gear 132c such as in a ratio of 2 or 3 to 1 or in a ratio of 1 to 2 or 3. When bypass assembly 132 is in the engaged position, tooth passage frequency sensors 502 are aligned with rotating ring gear 132c such that the alternating presence and absence of the passing gear teeth has a first frequency. When bypass assembly 132 is in the disengaged position, tooth passage frequency sensors 502 are aligned with rotating ring gear 132b which has a different number of splines than the number of teeth of ring gear 132c such that the alternating presence and absence of the passing splines has a second frequency. The frequency detected by tooth passage frequency sensors 502 is different for ring gear 132b versus ring gear 132c such that the change in frequency and/or the absolute frequency provides the engagement status of bypass assembly 132.

When tooth passage frequency sensors 502 are variable reluctance sensors, for example, the alternating presence and absence of the passing gear teeth vary the reluctance of a magnetic field, which dynamically changes the magnetic field strength. This changing magnetic field strength induces a current into a coil winding which is attached to the output terminals such that the variable reluctance sensors provide a frequency output. Alternatively or additionally, tooth passage frequency sensors 502 may be used to detect a change in the annular speed of bypass assembly 132 in the engaged position versus the disengage position, even in embodiments having the same number of teeth on both ring gears 132b, 132c. In this implementation, tooth passage frequency sensors 502 provide a first frequency reading when bypass assembly 132 is in the engaged position and a second frequency reading, based upon a lower or a higher annular speed of bypass assembly 132 depending upon the status of secondary engine 114, when bypass assembly 132 is in the disengaged position, thereby providing the engagement status of bypass assembly 132.

Figure 7C:
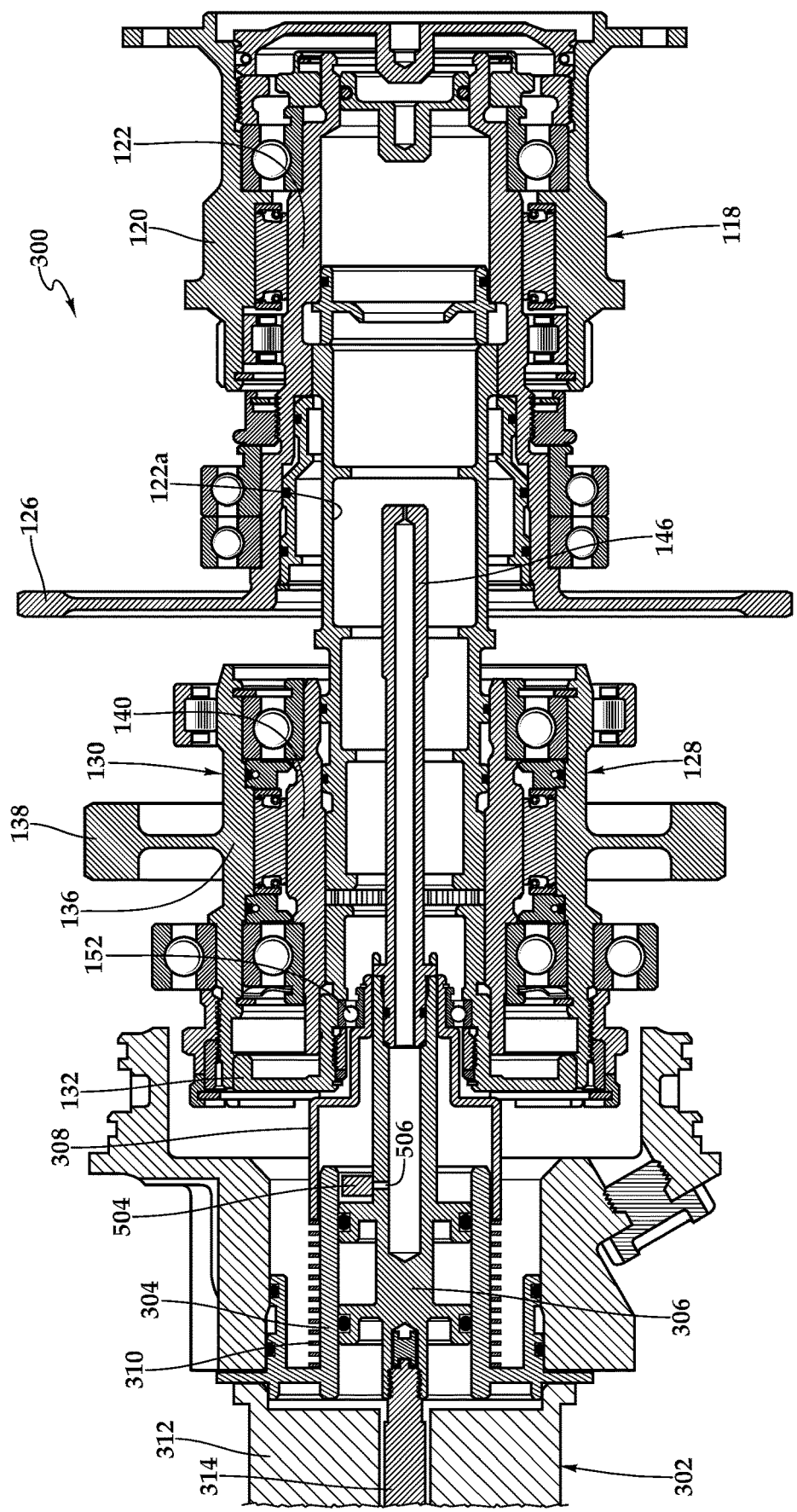

In a further example, FIG. 7C depicts secondary gearbox 300 with bypass assembly 132 in the engaged position. In the illustrated embodiment, multimode clutch assembly 128 includes one or more oil pressure sensors 504 which may be positioned within actuator liner 304 or may be otherwise located within the secondary gearbox downstream of an oil pressure passageway. Oil pressure sensors 504 are selectively aligned with one or more ports 506 of piston 306 that are in communication with the lubrication circuit of secondary gearbox 300 to detect the presence or absence of oil pressure and/or a high pressure or low pressure condition. Specifically, when bypass assembly 132 is in the disengaged position, ports 506 are not aligned with oil pressure sensors 504 whereas, when bypass assembly 132 is in the engaged position, ports 506 are aligned with oil pressure sensors 504. A pressure reading below a predetermined threshold by oil pressure sensors 504 indicates bypass assembly 132 is not in the engaged position while a pressure reading above a predetermined threshold indicates bypass assembly 132 is in the engaged position, thereby providing the engagement status of bypass assembly 132.

Figure 7D:
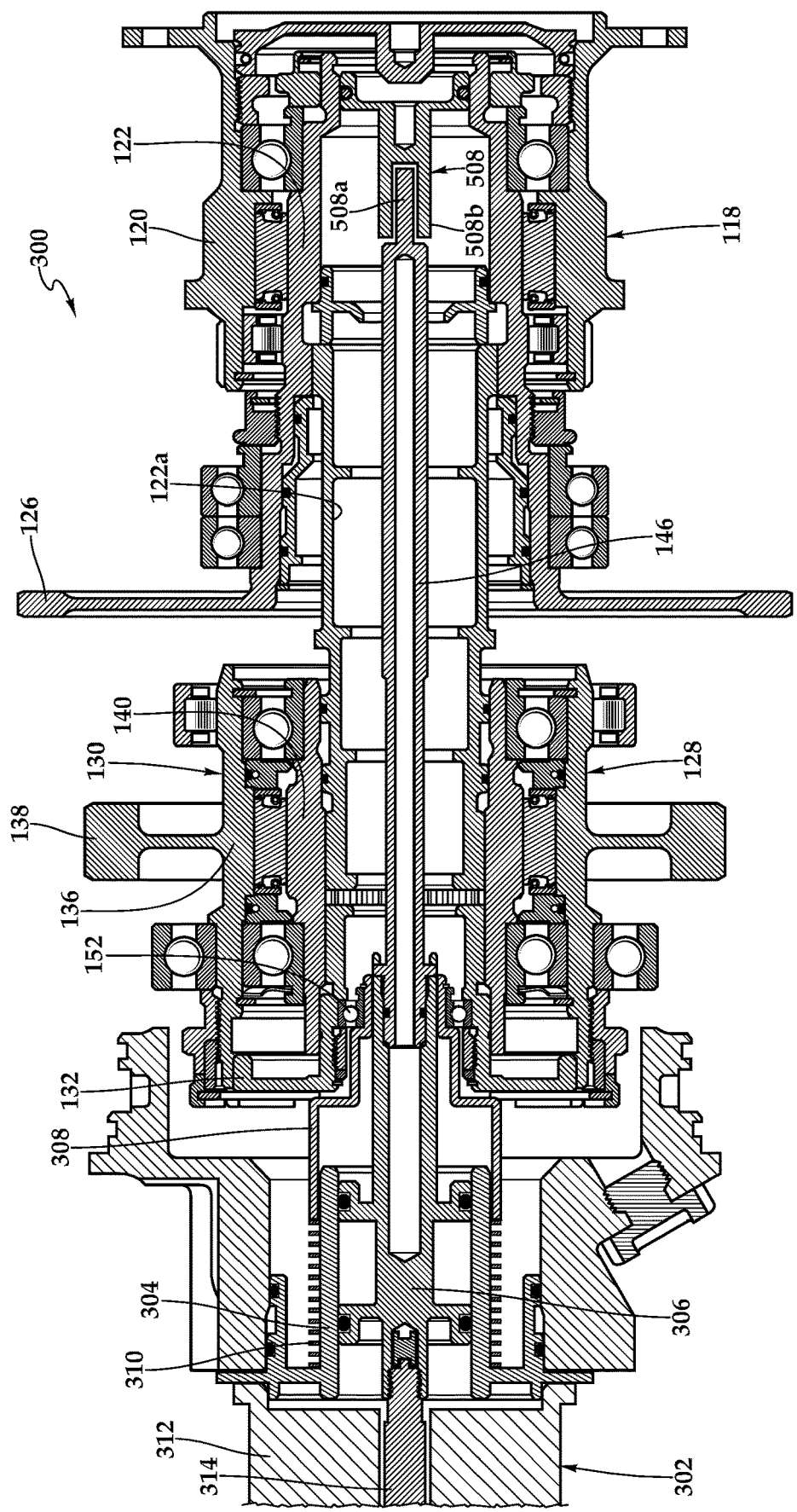

FIG. 7D depicts secondary gearbox 300 with bypass assembly 132 in the engaged position. In the illustrated embodiment, multimode clutch assembly 128 includes an engagement status sensor depicted as a variable differential transformer in the form of a linear variable differential transformer 508. Linear variable differential transformer 508 includes a core 508a that is coupled to the end of oil jet 146 that translates within a coil assembly 508b such that an input voltage within coil assembly 508b induces two output voltages as piston 306 is shifted between first and second positions. The electrical signals generated in responsive to the rectilinear motion of core 508a relative to coil assembly 508b is used to determine the engagement status of bypass assembly 132.

Figure 7E:
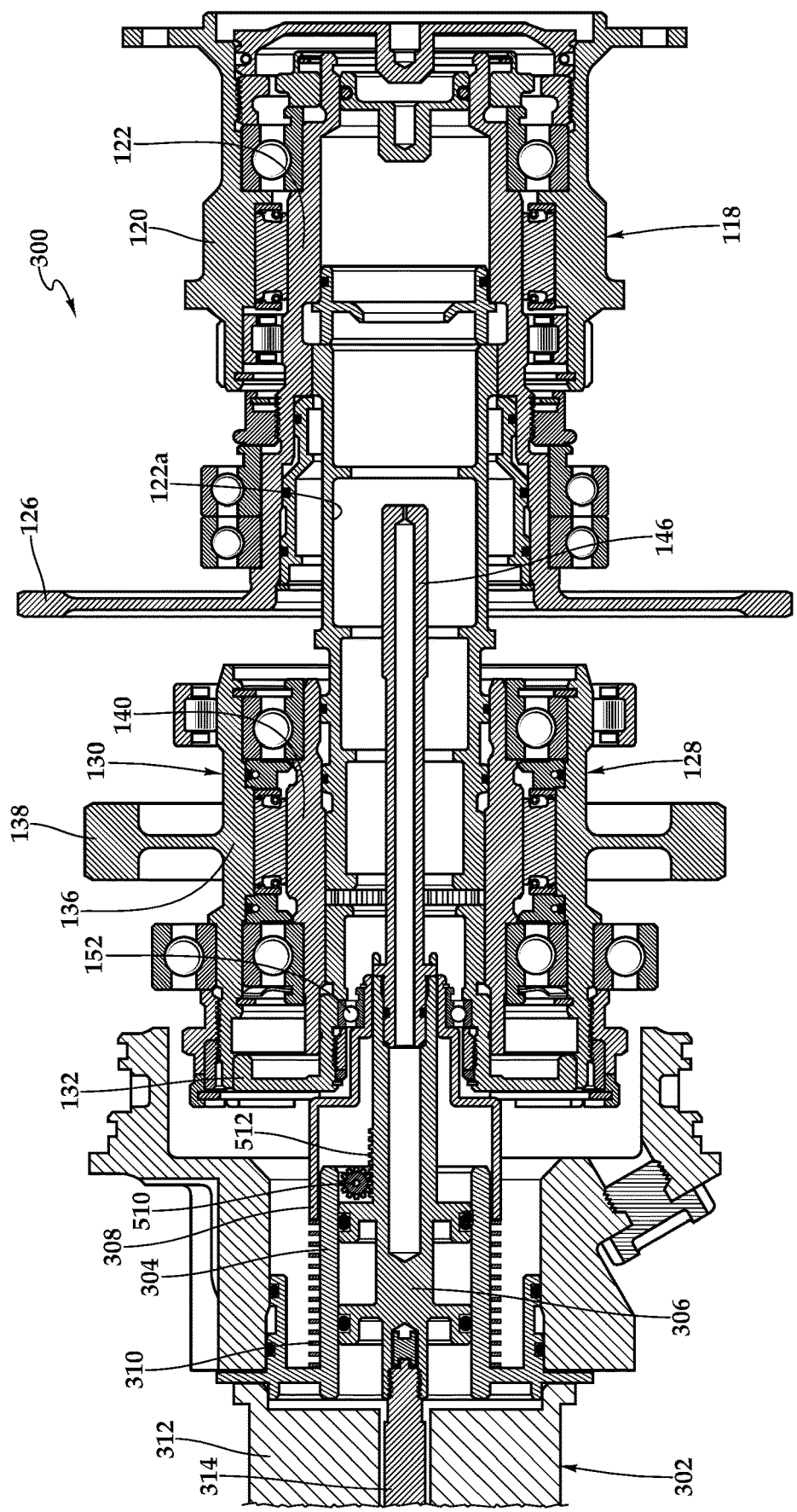

FIG. 7E depicts secondary gearbox 300 with bypass assembly 132 in the engaged position. In the illustrated embodiment, multimode clutch assembly 128 includes an engagement status sensor depicted as a variable differential transformer in the form of a rotary variable differential transformer 510. An input shaft of rotary variable differential transformer 510 is rotated by gear teeth 512 on piston 306 as piston 306 is shifted between first and second positions. Rotary variable differential transformer 510 provides a variable alternating current output voltage that is linearly proportional to the angular displacement of the input shaft. These electrical signals are used to determine the engagement status of bypass assembly 132.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A multimode clutch assembly for a rotorcraft, the clutch assembly comprising:
    a freewheeling unit having an input race and an output race, the freewheeling unit having a driving mode in which torque applied to the input race is transferred to the output race and an overrunning mode in which torque applied to the output race is not transferred to the input race;
    a bypass assembly having an engaged position in which the bypass assembly couples the input and output races of the freewheeling unit and a disengaged position in which the bypass assembly does not couple the input and output races of the freewheeling unit;
    an actuator assembly having an engagement configuration supplying an engagement force to shift the bypass assembly from the disengaged position to the engaged position and a disengagement configuration supplying a disengagement force to shift the bypass assembly from the engaged position to the disengaged position; and
    a load cell sensor operably associated with the bypass assembly, the load cell sensor configured to monitor the position of the bypass assembly relative thereto to determine an engagement status of the bypass assembly;
    wherein, in the disengaged position of the bypass assembly, the overrunning mode of the freewheeling unit is enabled such that the clutch assembly is configured for unidirectional torque transfer from the input race to the output race; and
    wherein, in the engaged position of the bypass assembly, the overrunning mode of the freewheeling unit is disabled such that the clutch assembly is configured for bidirectional torque transfer between the input and output races.

2. A powertrain for a rotorcraft, the powertrain comprising:
    a main drive system including a main engine;
    a secondary engine; and
    a multimode clutch assembly positioned between the main drive system and the secondary engine, the clutch assembly including:
    a freewheeling unit having an input race coupled to the main drive system and an output race coupled to the secondary engine, the freewheeling unit having a driving mode in which torque applied to the input race is transferred to the output race and an overrunning mode in which torque applied to the output race is not transferred to the input race;
    a bypass assembly having an engaged position in which the bypass assembly couples the input and output races of the freewheeling unit and a disengaged position in which the bypass assembly does not couple the input and output races of the freewheeling unit;
    an actuator assembly having an engagement configuration supplying an engagement force to shift the bypass assembly from the disengaged position to the engaged position and a disengagement configuration supplying a disengagement force to shift the bypass assembly from the engaged position to the disengaged position; and
    an engagement status sensor operably associated with at least one of the bypass assembly and the actuator assembly, the engagement status sensor configured to determine an engagement status of the bypass assembly;
    wherein, in the disengaged position of the bypass assembly, the overrunning mode of the freewheeling unit is enabled such that the clutch assembly is configured for unidirectional torque transfer from the input race to the output race; and
    wherein, in the engaged position of the bypass assembly, the overrunning mode of the freewheeling unit is disabled such that the clutch assembly is configured for bidirectional torque transfer between the input and output races.

3. The powertrain as recited in claim 2 wherein the main engine further comprises a first gas turbine engine and wherein the secondary engine further comprises a second gas turbine engine.

4. The powertrain as recited in claim 2 wherein the main engine further comprises a gas turbine engine and wherein the secondary engine further comprises an electric motor.

5. The powertrain as recited in claim 2 wherein the engagement status sensor further comprises a proximity sensor.

6. The powertrain as recited in claim 5 wherein the actuator assembly further comprises a liner, a piston and a bearing sled, the piston slidably disposed relative to the liner, the bearing sled coupled between the piston and the bypass assembly; and
    wherein, the proximity sensor further comprises an inductive proximity sensor configured to monitor the position of the bearing sled relative thereto to determine the engagement status of the bypass assembly.

7. The powertrain as recited in claim 5 wherein the proximity sensor further comprises a load cell configured to monitor the position of the bypass assembly relative thereto to determine the engagement status of the bypass assembly.

8. The powertrain as recited in claim 7 wherein the load cell further comprises a strain sensor.

9. The powertrain as recited in claim 2 wherein the engagement status sensor further comprises an oil pressure sensor.

10. The powertrain as recited in claim 2 wherein the engagement status sensor further comprises a tooth passage frequency sensor.

11. The powertrain as recited in claim 10 wherein the tooth passage frequency sensor further comprises a variable reluctance sensor.

12. The powertrain as recited in claim 10 wherein the tooth passage frequency sensor further comprises a hall-effect sensor.

13. The powertrain as recited in claim 2 wherein the engagement status sensor further comprises a variable differential transformer.

14. The powertrain as recited in claim 13 wherein the variable differential transformer further comprises a linear variable differential transformer.

15. The powertrain as recited in claim 13 wherein the variable differential transformer further comprises a rotary variable differential transformer.

16. A rotorcraft comprising:
a main rotor coupled to a main drive system including a main engine;
a secondary engine; and
a multimode clutch assembly positioned between the main drive system and the secondary engine, the clutch assembly including:
a freewheeling unit having an input race coupled to the main drive system and an output race coupled to the secondary engine, the freewheeling unit having a driving mode in which torque applied to the input race is transferred to the output race and an overrunning mode in which torque applied to the output race is not transferred to the input race;
a bypass assembly having an engaged position in which the bypass assembly couples the input and output races of the freewheeling unit and a disengaged position in which the bypass assembly does not couple the input and output races of the freewheeling unit;
an actuator assembly having an engagement configuration supplying an engagement force to shift the bypass assembly from the disengaged position to the engaged position and a disengagement configuration supplying a disengagement force to shift the bypass assembly from the engaged position to the disengaged position; and
an engagement status sensor operably associated with at least one of the bypass assembly and the actuator assembly, the engagement status sensor configured to determine an engagement status of the bypass assembly;
wherein, in the disengaged position of the bypass assembly, the overrunning mode of the freewheeling unit is enabled such that the clutch assembly is configured for unidirectional torque transfer from the input race to the output race; and
wherein, in the engaged position of the bypass assembly, the overrunning mode of the freewheeling unit is disabled such that the clutch assembly is configured for bidirectional torque transfer between the input and output races.

17. The rotorcraft as recited in claim 16 wherein, in a preflight configuration, the bypass assembly is in the disengaged position, the main engine is not operating and the secondary engine provides power to at least one rotorcraft accessory.

18. The rotorcraft as recited in claim 16 wherein, in an enhanced power configuration, the bypass assembly is in the engaged position, the main engine provides power to the main drive system and the secondary engine provides power to at least one rotorcraft accessory and to the main drive system through the clutch assembly.

19. The rotorcraft as recited in claim 16 wherein, in a high efficiency configuration, the bypass assembly is in the engaged position, the secondary engine is in standby mode and the main engine provides power to the main drive system and to at least one rotorcraft accessory through the clutch assembly.

20. The rotorcraft as recited in claim 16 wherein, in an enhanced autorotation configuration, the bypass assembly is in the engaged position, the main engine is not operating and the secondary engine provides power to the main drive system through the clutch assembly.

* * * * *